(12) United States Patent
Kheil et al.

(10) Patent No.: US 9,776,353 B2
(45) Date of Patent: Oct. 3, 2017

(54) LONGITUDINAL BEAD MOLDING

(71) Applicant: Velcro BVBA, Deinze (BE)

(72) Inventors: Victor Horst Kheil, Kitchener (CA); Earl Lorne Cowley, Ajax (CA); Paul Joseph Voigt, Waterdown (CA)

(73) Assignee: Velcro BVBA (BE)

( * ) Notice: Subject to any disclaimer, the term of this patent is extended or adjusted under 35 U.S.C. 154(b) by 306 days.

(21) Appl. No.: 14/493,765

(22) Filed: Sep. 23, 2014

(65) Prior Publication Data

US 2015/0089773 A1   Apr. 2, 2015

Related U.S. Application Data

(60) Provisional application No. 61/885,692, filed on Oct. 2, 2013.

(51) Int. Cl.
*B29C 47/06* (2006.01)
*B29C 47/32* (2006.01)
(Continued)

(52) U.S. Cl.
CPC .......... *B29C 47/065* (2013.01); *B29C 43/222* (2013.01); *B29C 43/28* (2013.01);
(Continued)

(58) Field of Classification Search
CPC ..... B29C 47/065; B29C 43/28; B29C 43/222; B29C 47/02; B29C 47/0066;
(Continued)

(56) References Cited

U.S. PATENT DOCUMENTS

| | | | |
|---|---|---|---|
| 3,669,585 A | * | 6/1972 | Krupp .................... B29C 47/32 425/113 |
| 4,079,114 A | * | 3/1978 | Bonner .................. B29C 59/04 264/147 |

(Continued)

FOREIGN PATENT DOCUMENTS

| | | |
|---|---|---|
| CN | 1142882 | 2/1997 |
| CN | 1988992 | 6/2007 |
| WO | WO2014139933 A1 | 9/2014 |

OTHER PUBLICATIONS

International Search Report and Written Opinion for PCT/EP2014/070895 mailed Feb. 18, 2015 (9 pp).
(Continued)

*Primary Examiner* — Jeffrey Wollschlager
(74) *Attorney, Agent, or Firm* — Fish & Richardson P.C.

(57) ABSTRACT

An edge-beaded fastener product such as a cushion cover tie-down has a molded profile bead secured to and extending along a flexible strip adjacent a longitudinal edge of the strip. The profile bead has a shoulder or an inboard sidewall extending away from the strip, such as for retaining a clip or hog ring. The flexible strip may have a reinforced region, inboard of the shoulder, in which resin contiguous with resin forming the profile bead encapsulates surface features of the strip. The product is made by molding resin directly onto the strip. Multiple lanes of resin may be molded on a single substrate, which is severed to form individual strips with severed, exposed strip edges.

18 Claims, 17 Drawing Sheets

(51) Int. Cl.
    *B29C 47/02*      (2006.01)
    *B29C 47/00*      (2006.01)
    *B68G 7/12*       (2006.01)
    *B29C 43/22*      (2006.01)
    *B29C 43/28*      (2006.01)
    *B29K 105/00*     (2006.01)
    *B29K 101/12*     (2006.01)
    *B29K 705/00*     (2006.01)
    *B29L 7/00*       (2006.01)

(52) U.S. Cl.
    CPC .......... *B29C 47/0066* (2013.01); *B29C 47/02* (2013.01); *B29C 47/32* (2013.01); *B68G 7/12* (2013.01); *B29C 2793/009* (2013.01); *B29C 2793/0036* (2013.01); *B29C 2793/0045* (2013.01); *B29K 2101/12* (2013.01); *B29K 2105/256* (2013.01); *B29K 2705/00* (2013.01); *B29L 2007/008* (2013.01); *Y10T 24/38* (2015.01)

(58) Field of Classification Search
    CPC .............. B29C 2793/009; B29C 47/32; B29C 2793/0036; B29C 2793/0045; B68G 7/12; Y10T 24/38; B29K 2105/256; B29K 2101/12; B29K 2705/00; B29L 2007/008
    See application file for complete search history.

(56) References Cited

U.S. PATENT DOCUMENTS

| | | | |
|---|---|---|---|
| 4,581,269 A | 4/1986 | Tilman | |
| 5,643,651 A * | 7/1997 | Murasaki | A44B 18/0003 24/442 |
| 5,945,131 A * | 8/1999 | Harvey | A44B 18/0049 425/141 |
| 5,997,522 A * | 12/1999 | Provost | A44B 18/0049 2/912 |
| 6,202,260 B1 | 3/2001 | Clune et al. | |
| 6,367,128 B1 * | 4/2002 | Galkiewicz | A44B 18/0053 24/572.1 |
| 6,656,563 B1 | 12/2003 | Leach et al. | |
| 6,896,759 B2 * | 5/2005 | Fujisawa | A44B 18/0049 156/244.18 |
| 6,913,786 B2 | 7/2005 | Proulx et al. | |
| 7,077,473 B2 | 7/2006 | Demain et al. | |
| 7,172,008 B2 * | 2/2007 | Vanbenschoten | A44B 18/0049 156/244.22 |
| 7,303,711 B2 | 12/2007 | Gallant et al. | |
| 7,395,583 B2 * | 7/2008 | Clune | A44B 18/0011 24/442 |
| 8,413,306 B2 | 4/2013 | Gallant et al. | |
| 8,522,406 B2 | 9/2013 | Voigt | |
| 2003/0085485 A1 * | 5/2003 | Seidel | B29C 43/222 264/166 |
| 2004/0031130 A1 | 2/2004 | Clarner et al. | |
| 2007/0069559 A1 | 3/2007 | Poulakis | |
| 2009/0064469 A1 * | 3/2009 | Dowd | A44B 18/0057 24/452 |
| 2010/0060051 A1 | 3/2010 | Poulakis | |
| 2010/0117434 A1 | 5/2010 | Galbreath et al. | |
| 2013/0065009 A1 | 3/2013 | Katsumoto et al. | |
| 2013/0117973 A1 | 5/2013 | Murasaki et al. | |
| 2013/0280474 A1 * | 10/2013 | Medina | B32B 3/06 428/99 |

OTHER PUBLICATIONS

International Preliminary Examination Report for PCT/EP2014/070895 mailed Apr. 5, 2016.

Chinese Office Action in Chinese Application No. 201480064118.9, dated Feb. 28, 2017, 20 pages (English Translation).

* cited by examiner

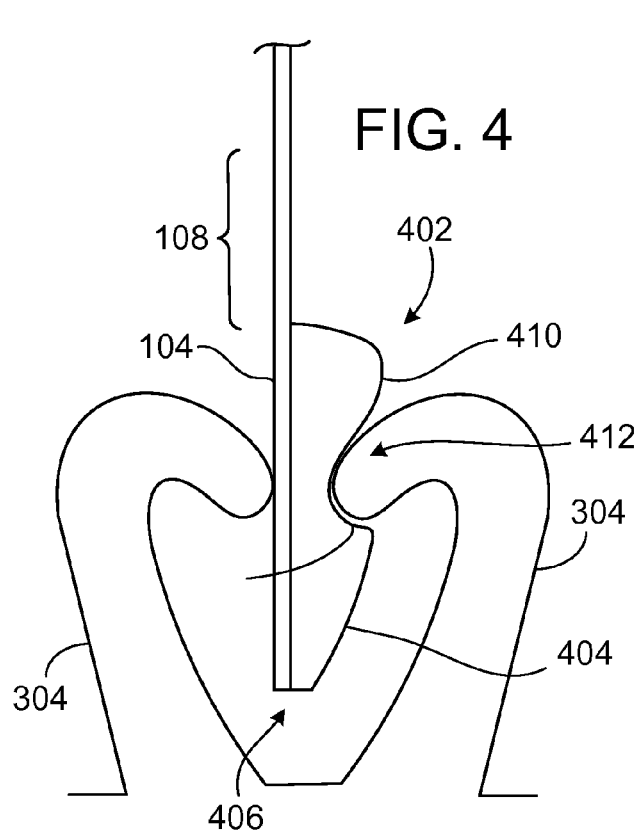
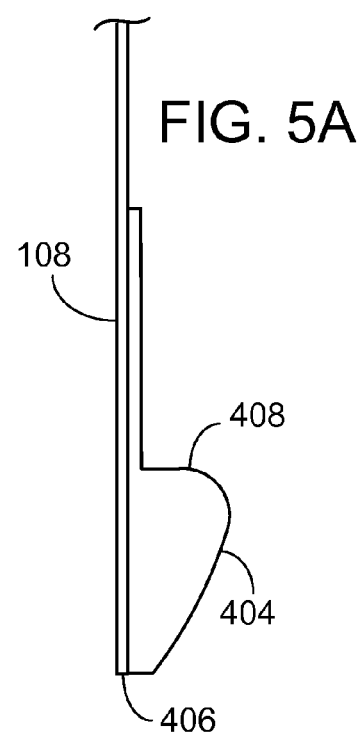
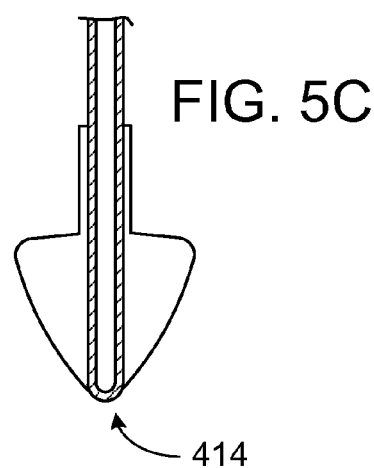
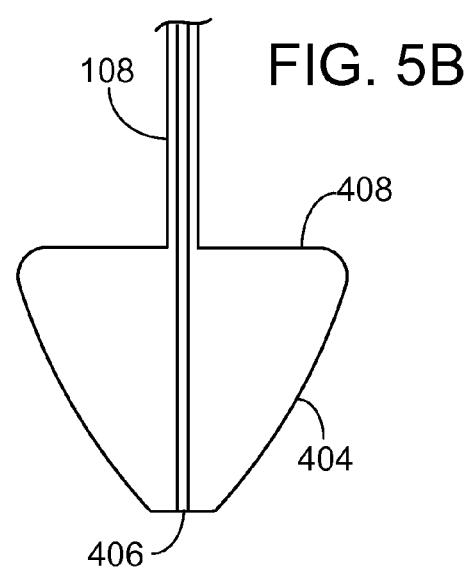

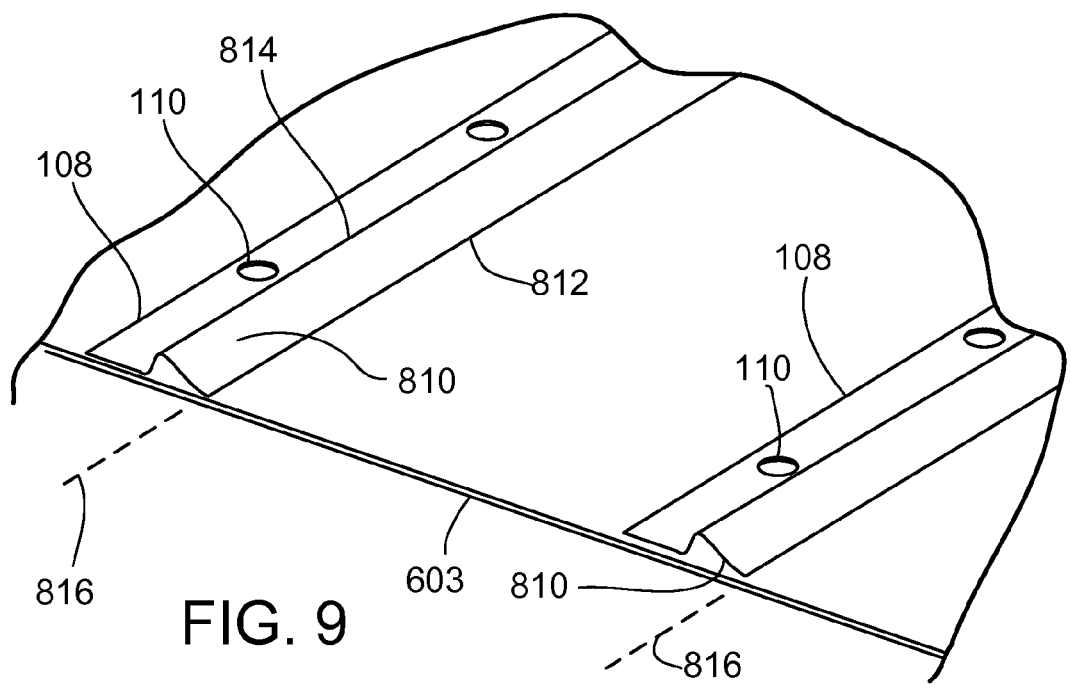
FIG. 9
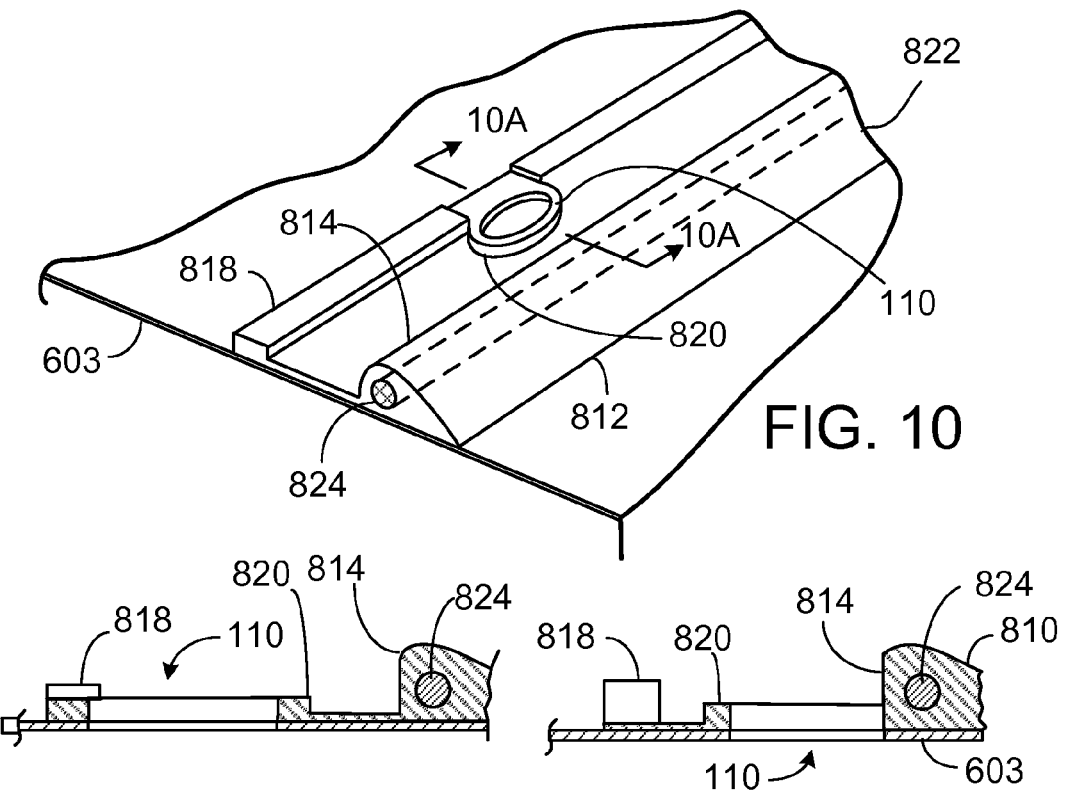
FIG. 10
FIG. 10A
FIG. 10B

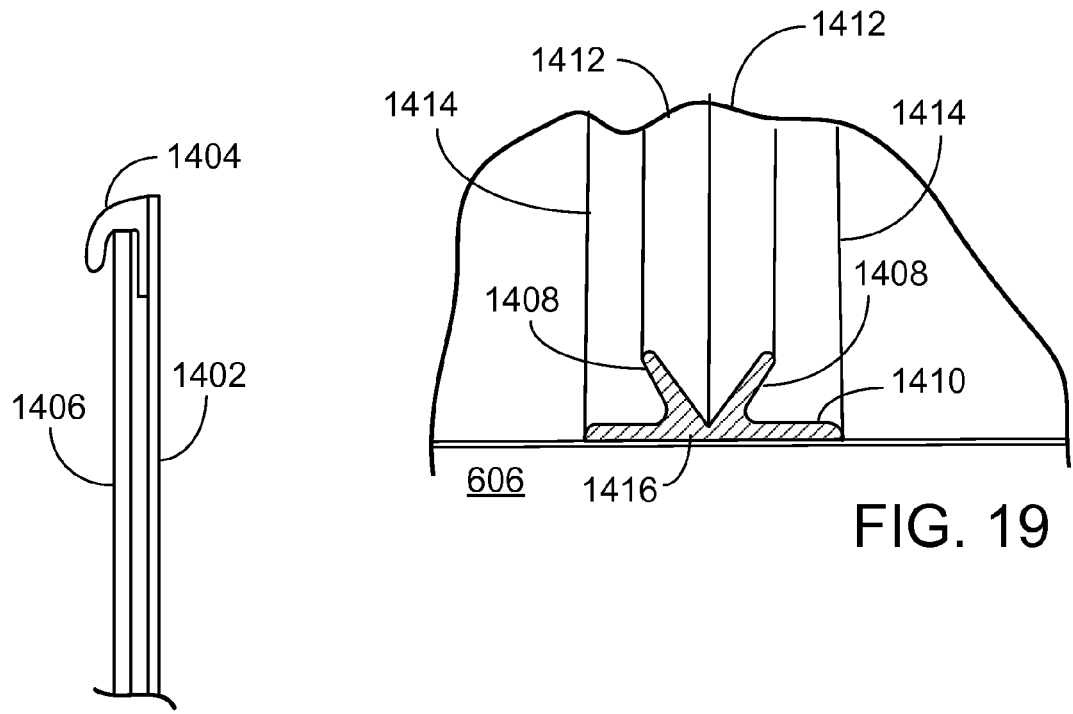
FIG. 18
FIG. 19
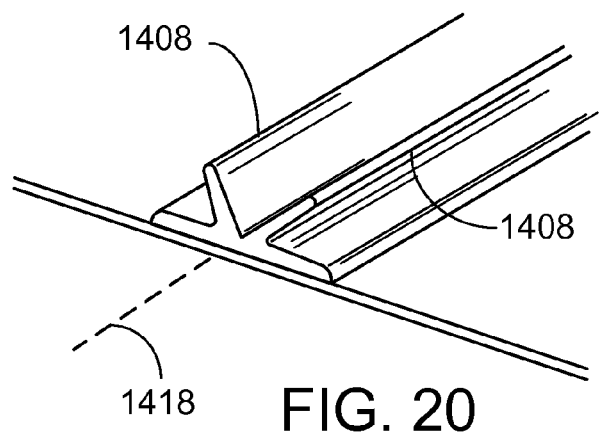
FIG. 20
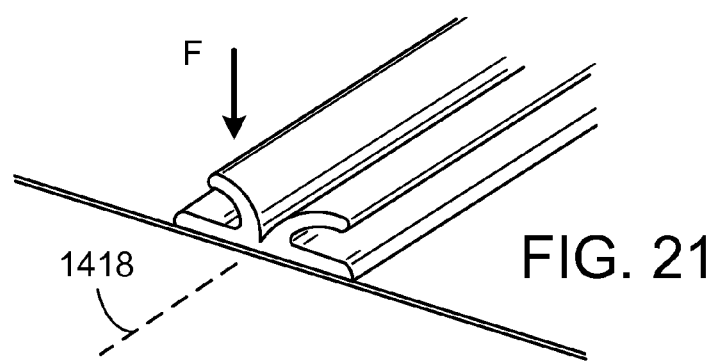
FIG. 21

LONGITUDINAL BEAD MOLDING

TECHNICAL FIELD

This invention relates to molding beads along fabric webs, and particularly to forming fabric strips with edge listing beads for use as tie-downs in retaining cushion covers and the like.

BACKGROUND

Fabrics carrying longitudinal ribs or beads of resin have several uses. In one use, fabric strips having such a bead along one edge are employed as tie-downs to secure upholstery or other covers over seat cushions. In such applications the bead of resin is commonly referred to as a listing bead, and it is known to extrude such resin beads along a free edge of a strip of fabric, such as in a one-up, two stage profile extrusion and overmolding process to form such products. Tie-downs with listing beads can be sewn into seams or to the edge of the upholstery and engaged with clips or hog rings to hold the upholstery in place, either to a foam cushion or directly to a seat frame.

Bead-carrying fabrics also have other uses. Improvements in the methods of producing such products, and in the products themselves, are sought, either for covering foam cushions or other applications.

SUMMARY

One aspect of the invention features a method of making a continuous sheet-form product carrying a profiled bead of resin along a length thereof. The method includes continuously passing a flexible substrate through a nip defined between two counter-rotating rolls, introducing a flow of moldable resin into the nip between the flexible substrate and a first of the two rolls, in an area in which an outer surface of the first of the two rolls defines a peripheral molding recess, and molding the resin in the peripheral molding recess to form a profile bead bonded to a side of the flexible substrate and extending along the substrate between exposed regions of substrate surface. The recess is shaped such that the profile bead defines a longitudinal slitting channel extending along the flexible substrate, along which channel the profile bead has a lesser tear resistance than on either side of the channel.

In some cases, the method also includes slitting the profile bead and substrate longitudinally along the slitting channel, thereby forming two separate substrate strips each having a corresponding portion of the bead extending along an exposed, severed edge of the substrate.

The resin may be introduced in separate flows to two or more spaced apart regions of the flexible substrate and molded in two or more corresponding molding recesses of the first of the two rolls, thereby forming two or more spaced-apart profile beads each defining a slitting channel and each extending along the flexible substrate between longitudinal exposed regions of substrate surface. In some applications the method also includes slitting the profile beads along the slitting channels, thereby forming three or more separate substrate strips each having a corresponding profile bead portion extending along a longitudinal edge thereof.

In some embodiments, a portion of the flowable resin engages the outer surface of the first of the two rolls adjacent the molding recess, and impregnates the substrate in a region immediately adjacent the profile bead as the resin is molded, thereby forming a reinforced region of the substrate adjacent the profile bead.

In some cases, the method includes forming a series of apertures extending through the reinforced region and spaced along the substrate. Before forming the series of apertures, a series of elevated pads may be molded, spaced along the substrate and through which the apertures are formed, such that the formed apertures are bounded by elevated rims of resin from the pads.

In some applications, the resin portion engaging the outer surface of the first of the two rolls adjacent the molding recess forms a layer of resin disposed on the substrate, thinner than the profile bead, and disposed between the profile bead and an exposed region of the substrate surface.

The outer surface of the first of the two rolls, in some examples of the method, also defines a circumferential groove extending about the first of the two rolls and spaced from the peripheral recess. In such cases a rib of resin may be formed in the groove, the rib forming a lateral edge of the reinforced region.

In some examples, the substrate, as introduced to the nip, defines holes that go through the substrate. The substrate is introduced to the nip with the holes aligned with the moldable resin, such that pressure in the nip forces some of the resin into the holes. In some cases, a second of the two rolls has a surface that defines a recess positioned to receive resin pressed through the holes of the substrate in the nip, thereby forming a molded protrusion of the resin on a side of the substrate opposite the profile bead. The molded protrusion may be a longitudinally continuous bead, for example.

In some embodiments the molded profile bead has a longitudinal shoulder spaced laterally from the slitting channel.

The substrate, in some applications, has a fabric surface on which the profile bead is molded. The fabric surface may be of a woven structure, for example. In some other examples, the fabric surface may be of a knit or non-woven structure.

In some embodiments the method also includes passing the substrate and profile bead through a second nip in which the formed bead is plastically deformed to alter a shape of the profile bead. In some cases the formed profile bead has flanges extending away from the substrate on either side of the slitting channel, and passing the substrate and profile bead through the second nip bends the flanges toward the substrate.

In many cases the profile bead is longitudinally continuous and of constant cross-section along the continuous length of the substrate. In some other cases, the profile bead is of a cross-section that varies along the substrate. For example, for some applications the bead is segmented, with segments of the bead being longitudinally spaced and each defining a shoulder segment.

The peripheral recess may be, in some examples, circumferentially discontinuous and include separate recess cavities. Molding the resin may involve filling the separate cavities from a continuous flow of the moldable resin.

In some embodiments, molding the resin further includes molding a series of resin protrusions extending from the substrate and spaced laterally from, and longitudinally between, adjacent segments of the bead.

In some configurations, molding the resin includes pressing resin through the substrate in spaces between the recess cavities, thereby forming a longitudinally spaced series of protrusions on a side of the substrate opposite the bead segments. The series of protrusions may include, or be in the form of, bead segments each defining a shoulder.

In some examples, the method includes introducing a pre-formed, longitudinally continuous wire to the nip with the moldable resin, such that the wire becomes embedded in the profile bead as the resin is molded. The wire may comprise metal, for example.

Another aspect of the invention features a method of making a continuous flexible strip of substrate carrying a bead of resin along an edge thereof. The method includes continuously passing a flexible substrate sheet through a nip defined between two counter-rotating rolls; introducing a flow of moldable resin into the nip between the flexible substrate and a first of the two rolls, in an area in which an outer surface of the first of the two rolls defines a peripheral molding recess; and molding the resin in the peripheral molding recess to form a profile bead bonded to a side of the flexible substrate and extending along the substrate between exposed regions of substrate surface The profile bead is formed to have a cross-section that increases in thickness across a tapered region of the profile bead to a longitudinal shoulder defining an abrupt transition in bead thickness. The method also includes longitudinally severing the substrate adjacent the tapered region of the profile bead along a line spaced from the shoulder, thereby forming a strip of the substrate carrying a bead of molded resin adjacent a severed longitudinal edge of the strip.

In some embodiments the resin is introduced in separate flows to two spaced apart regions of the flexible substrate and molded in two corresponding molding recesses of the first of the two rolls, thereby forming two spaced-apart profile beads each extending along the flexible substrate between longitudinal exposed regions of substrate surface.

In some cases, longitudinally severing the substrate involves severing the substrate along parallel lines each adjacent the tapered region of a respective one of the beads, thereby forming multiple substrate strips each carrying a bead of resin adjacent a severed edge of the strip.

In some examples of the method, a portion of the flowable resin engages the outer surface of the first of the two rolls adjacent the molding recess, and impregnates the substrate in a region immediately adjacent the profile bead as the resin is molded, thereby forming a reinforced region of the substrate adjacent the profile bead. In some examples, the reinforced region of the substrate and the tapered region of the profile bead are on opposite sides of the longitudinal shoulder.

In some embodiments, the method also includes forming a series of apertures extending through the reinforced region and spaced along the substrate. In some examples a series of elevated pads is molded along the substrate, and then the apertures are formed through the pads, such that the formed apertures are bounded by elevated rims.

In some embodiments, the outer surface of the first of the two rolls further defines a circumferential groove extending about the first of the two rolls and spaced from the peripheral recess, and molding the resin forms a rib of resin in the groove, the rib forming a lateral edge of the reinforced region.

As previously noted, the substrate, as introduced to the nip, may have holes aligned with the moldable resin, such that pressure in the nip forces some of the resin into the holes.

Other features discussed above may also be included in various embodiments of this aspect of the invention, depending on the circumstances.

According to another aspect of the invention, an edge-beaded fastener product includes an elongated, flexible strip having opposite longitudinal edges, and a molded profile bead secured to and extending along the flexible strip adjacent one of the longitudinal edges of the strip. The profile bead has an inboard sidewall extending away from the strip, and the flexible strip has a reinforced region, inboard of the inboard sidewall of the profile bead, in which resin contiguous with resin forming the profile bead encapsulates surface features of the strip. The reinforced region is of finite width and has an inboard edge spaced from the profile bead and the longitudinal edges of the strip.

In some embodiments, the molded profile bead is disposed adjacent an exposed longitudinal edge of the strip. In some cases, the molded profile bead has a severed edge coincident with the exposed longitudinal edge of the strip.

In some examples, the reinforced region is at least as wide as the profile bead.

In some configurations, the profile bead is longitudinally continuous.

In some configurations the profile bead is segmented, with segments of the profile bead spaced apart along an edge of the strip.

Some examples also have a pad of resin projecting from a side of the strip within the reinforced region, spaced from the longitudinal edges of the strip and aligned with a gap between adjacent profile bead segments.

Some examples have a longitudinal rib of resin at an inboard edge of the reinforced region, with the rib, reinforced region and profile bead all comprising portions of a contiguous mass of resin.

In some cases the flexible strip defines apertures through the strip. For some applications, the apertures are disposed within the reinforced region. The reinforced region may include rims of resin extending about the apertures and projecting from the strip.

In some embodiments the profile bead is disposed on only one broad side of the strip. In some other embodiments, the profile bead includes two bead portions each disposed on a respective side of the strip and each having an inboard sidewall extending away from the strip.

In some configurations the profile bead has a longitudinal flange extending away from the strip and disposed inboard of the sidewall, such that the flange and sidewall define a longitudinal recess therebetween. The longitudinal flange and sidewall may be of a longitudinally discrete clip receiver portion of the profile bead, for example.

The product may also include a wire embedded within the profile bead and extending along the product.

Another aspect of the invention features a cushion cover tie-down having an elongated, fabric strip with opposite longitudinal edges, and a molded profile bead of resin secured to and extending along the strip adjacent one of the longitudinal edges. The profile bead has an inboard sidewall extending away from the strip, and is disposed adjacent an exposed longitudinal edge of the strip.

In some embodiments, the exposed longitudinal edge of the strip features severed ends of fibers of the fabric strip, with the bead of resin encapsulating surface fibers of the strip adjacent the severed fiber ends.

In some examples the molded profile bead has a severed edge coincident with the exposed edge of the fabric strip.

The molded profile bead may have an inboard edge spaced from the exposed edge of the flexible strip, at which inboard edge the sidewall is positioned.

In some embodiments, the molded profile bead is contiguous with resin impregnating material of the flexible strip in a reinforced region between the sidewall of the molded profile bead and an exposed surface of the flexible strip. Some examples also feature a longitudinal rib of resin projecting from the strip along an inboard edge of the reinforced region. There may be a series of discrete holes through the tie-down and at least partially defined within the reinforced region.

As noted above, the profile bead may be disposed on only one broad side of the strip, or may include two bead portions each disposed on a respective side of the strip. Each may have an inboard sidewall extending away from the strip, with the exposed longitudinal edge exposed between the two bead portions.

Various features and characteristics of the profile bead noted above with respect to a method aspect of the invention may be found in various product embodiments.

Another aspect of the invention features a cushion cover tie-down having an elongated, fabric strip with opposite longitudinal edges, and a molded profile bead of resin secured to and extending along the strip adjacent one of the longitudinal edges, in which the profile bead has an inboard sidewall extending away from the strip, and a longitudinal flange extending away from the strip and positioned inboard of the sidewall, such that the flange and sidewall define a longitudinal recess between them.

In some cases, the sidewall and flange are longitudinally discontinuous and comprise segments spaced along the strip. The segments may be connected by a longitudinally continuous rail of resin.

In some examples the rail extends along the edge of the strip.

The strip may have a reinforced region, inboard of the flange of the profile bead, in which resin contiguous with resin forming the profile bead encapsulates surface features of the strip. The reinforced region is of finite width and has an inboard edge spaced from the flange and the longitudinal edges of the strip.

Another aspect of the invention features a cushion cover with two or more flexible cover sections joined along a seam, and one of the above-described cushion cover tie-downs joined to the cover sections at the seam, with the profile bead spaced from the cover sections.

The methods described herein can be employed to efficiently produce continuous lengths of tie-downs or other beaded strips that can be slit to width and/or cut to length for particular applications. Such methods may be more cost-effective than traditional edge over-molding extrusion techniques. Products produced according to the concepts discussed herein can be configured to fasten cushion covers, such as with manual or automated manipulation and engagement of clips and latch elements provided on the edge of a tie-down, or can be configured for other useful purposes, such as providing a reinforcement or fastening function at the edge of a flexible strip or sheet.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is an end view of a profile listing bead secured by a plastic retainer clip.

FIGS. 5A and 5B show different listing bead profiles.

FIG. 5C shows a double listing bead profile formed at a folded strip edge.

FIG. 9 shows a sheet of material to be slit adjacent molded profile beads.

FIG. 10 illustrates a molded profile bead containing a reinforcing wire, formed with an edge rib and an aperture rim.

FIG. 10A is a partial cross-sectional view, taken along line 10A-10A in FIG. 10.

FIG. 10B is a partial cross-sectional view of an alternate construction.

FIG. 18 is an edge view of a flexible cover engaging an edge of a rigid panel.

FIG. 19 shows a portion of a molding nip for forming a preform from which the edge bead of the cover FIG. 18 is made.

FIG. 20 shows a preform formed in the nip of FIG. 19.

FIG. 21 shows the preform of FIG. 20 after deformation.

Like symbols in different drawings indicate like elements.

DETAILED DESCRIPTION

Figure 1:
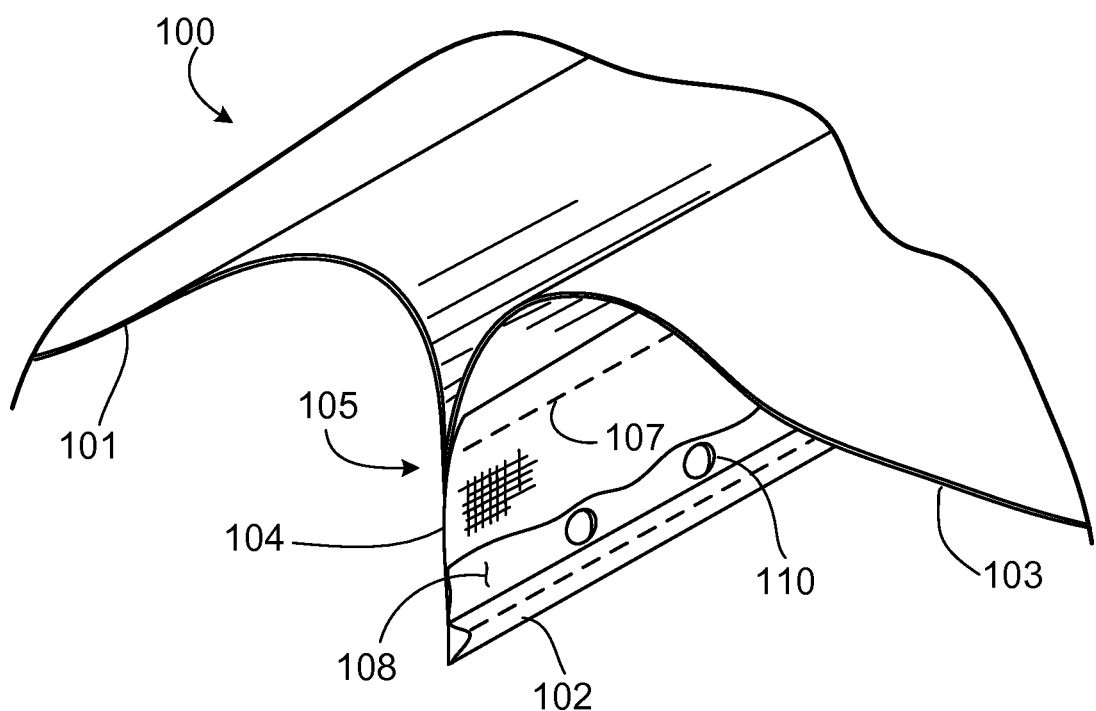
FIG. 1 is a perspective view of a portion of a cushion cover, showing a seam construction.

Referring first to FIG. 1, cushion cover 100 includes two flexible fabric, resin or leather sections 101 and 103 joined along a seam 105 by stitching 107. Also secured to the sections of the cover by stitching 107 is a fabric strip 104 that carries, along its free, distal, longitudinal edge a listing bead 102 protruding from one side of the strip. The listing bead is formed of resin molded onto a fabric web that forms the body of the strip. Strip 104 also features a reinforced region 108 extending upward from bead 102, in which resin contiguous with resin forming the bead reinforces the strip. The remainder of the strip, above region 108, is free of reinforcing resin and retains its flexibility. In this example, the strip also defines a series of apertures 110 extending through the strip within reinforced region 108, just above listing bead 102. Some examples are free of such apertures, and in some other examples the apertures are disposed partially within, and partially above the reinforced region of the strip, or fully above the reinforced region. The apertures may be, for example, five to six millimeters in diameter, and be spaced one to two millimeters inboard of the listing bead.

The fabric of strip 104 may be, for example, a woven, non-woven or knit fabric, such as are commonly employed in cushion cover trim flags commonly referred to as tie-downs. Strip 104 may be a textile sheet made of non-woven olefin fibers, such as polyethylene or polypropylene. As an example, strip 104 may be formed of material known commercially as DUON, manufactured by Phillips Fiber Corporation. However, other sheet materials may be used as desired, such as natural woven or non-woven textiles, synthetic woven or non-woven textiles, or sewable thermoplastic films.

Strip 104 is preferably sewn into the seam as the two cover sections are joined, such that the strip depends from the edges of the joined sections on an inner side of the cover at the seam.

As will be discussed further below, bead 102 is disposed adjacent an exposed longitudinal edge of the fabric of strip 104, and not formed to extend about, and envelop, the fabric edge as in some earlier listing bead designs.

Figure 2:
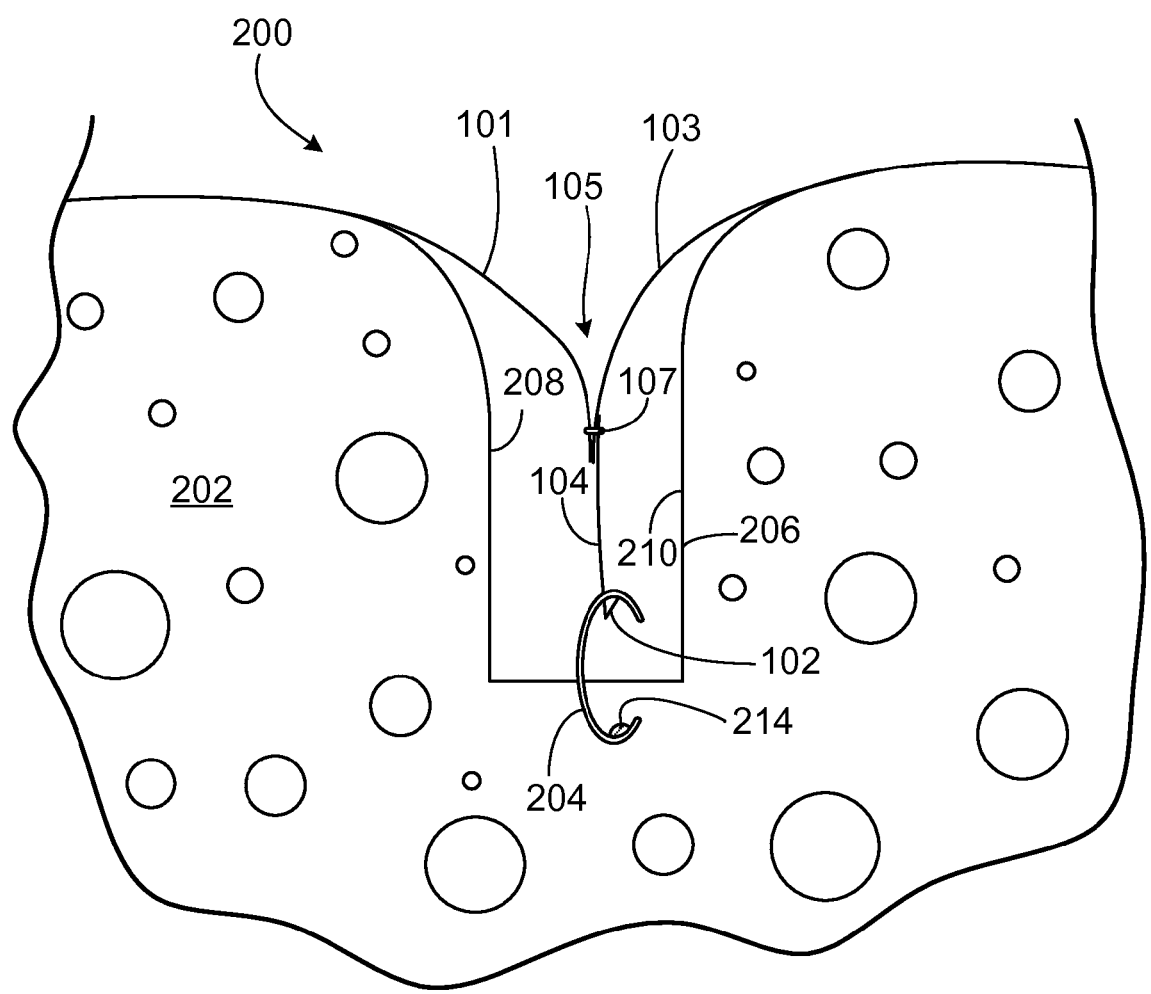
FIG. 2 is a partial cross-section view of a covered foam cushion, showing the seam of the cover secured at a foam trench by a hog ring.
Figure 2A:
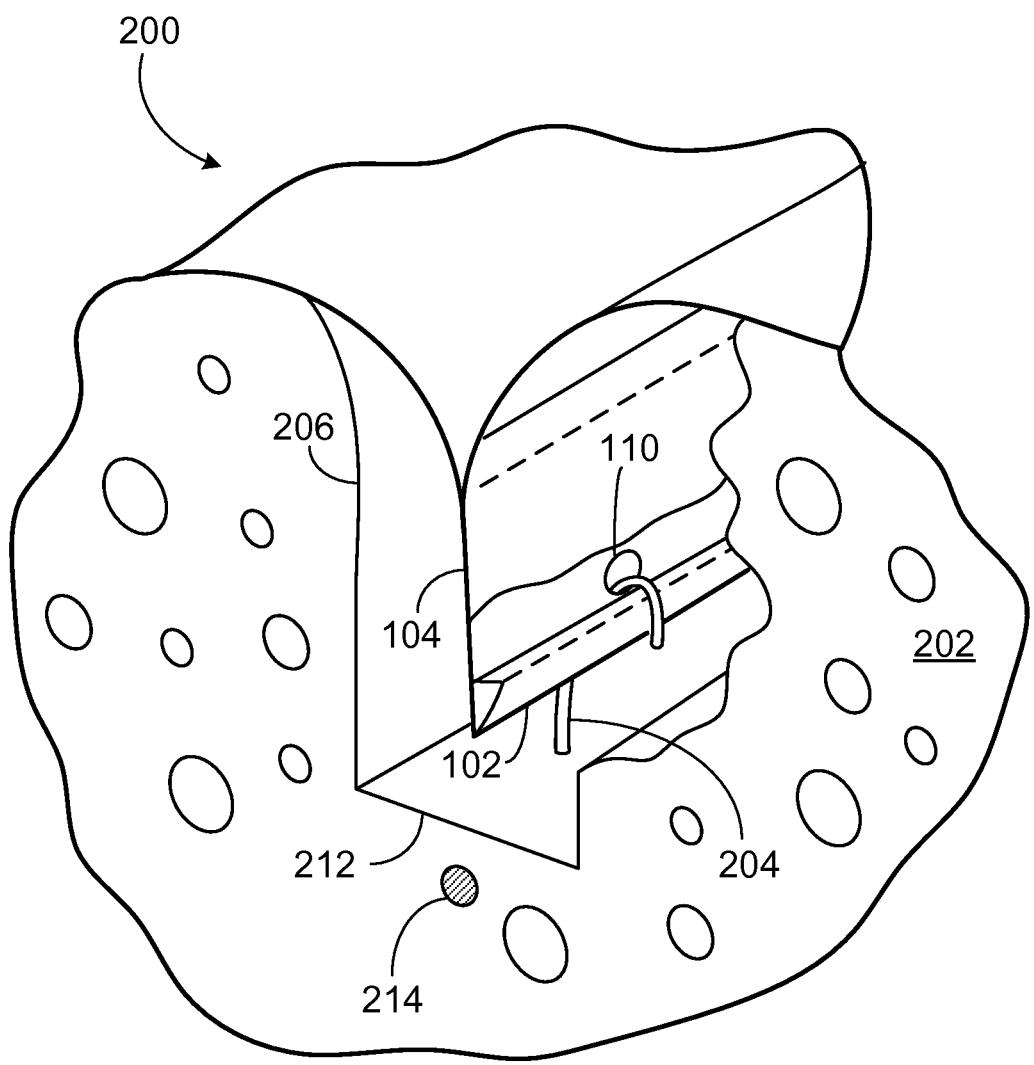
FIG. 2A is a partial cutaway view of the covered foam cushion trench of FIG. 2.

Referring next to FIGS. 2 and 2A, a foam cushion 200, such as of an automotive seat, has a foam bun 202 covered with the cushion cover of FIG. 1. The contoured outer bun surface features an elongated trench 206 positioned beneath seam 105 and into which strip 104 extends. The strip is held in place in the trench in this example by metal hog rings 204 that each extend through a respective one of the apertures 110 and around a wire 214 embedded in the foam bun below the trench and running along the trench. The strip 104 is held under tension by the hog rings, thereby holding the cover tight against the surface of the foam bun 202. The listing bead 102 bears at least some of the load applied by the hog rings to strip 104, helping to prevent tearing of the strip web.

Trench 206 is defined between two opposing side walls 208 and 210, and above a trench bottom 212. In this example, the opposing side walls 208 and 210 are parallel with each other and perpendicular to the trench bottom 212. In this example, the foam of the trench bottom is manually pierced during installation of hog rings 204, to maneuver the hog rings below the wire 214. In some other examples, slots or other apertures (not shown) are provided in the trench bottom, through which the wire is exposed for hooking. While the hog rings in this case are shown extending through apertures 110, in some cases the strip is provided without apertures and is manually pierced by the hog rings during installation. If piercing, the hog rings preferably pierce the reinforced region of the web, such that the resin in that region helps to prevent tearing or fraying of the web. Apertures 110 may be positioned at intervals selected for desired hog ring placement for a particular application, or they may be provided at repeating intervals and only certain ones used in any given application. One advantage of repeating aperture intervals (or not providing any apertures) is that strip 104 can be manufactured in one style and provided in spool form for use in several different applications.

Hog ring 204 preferably bears against the upper surface of listing bead 102, as shown, such that the bead directly carries hog ring load by direct hog ring engagement. Even in cases where the hog ring does not directly contact the listing bead, the presence of the bead along the edge of strip 104 helps to strengthen the web of the strip against hog ring pullout, and also helps to distribute some of the hog ring load longitudinally along the strip.

Figure 3:
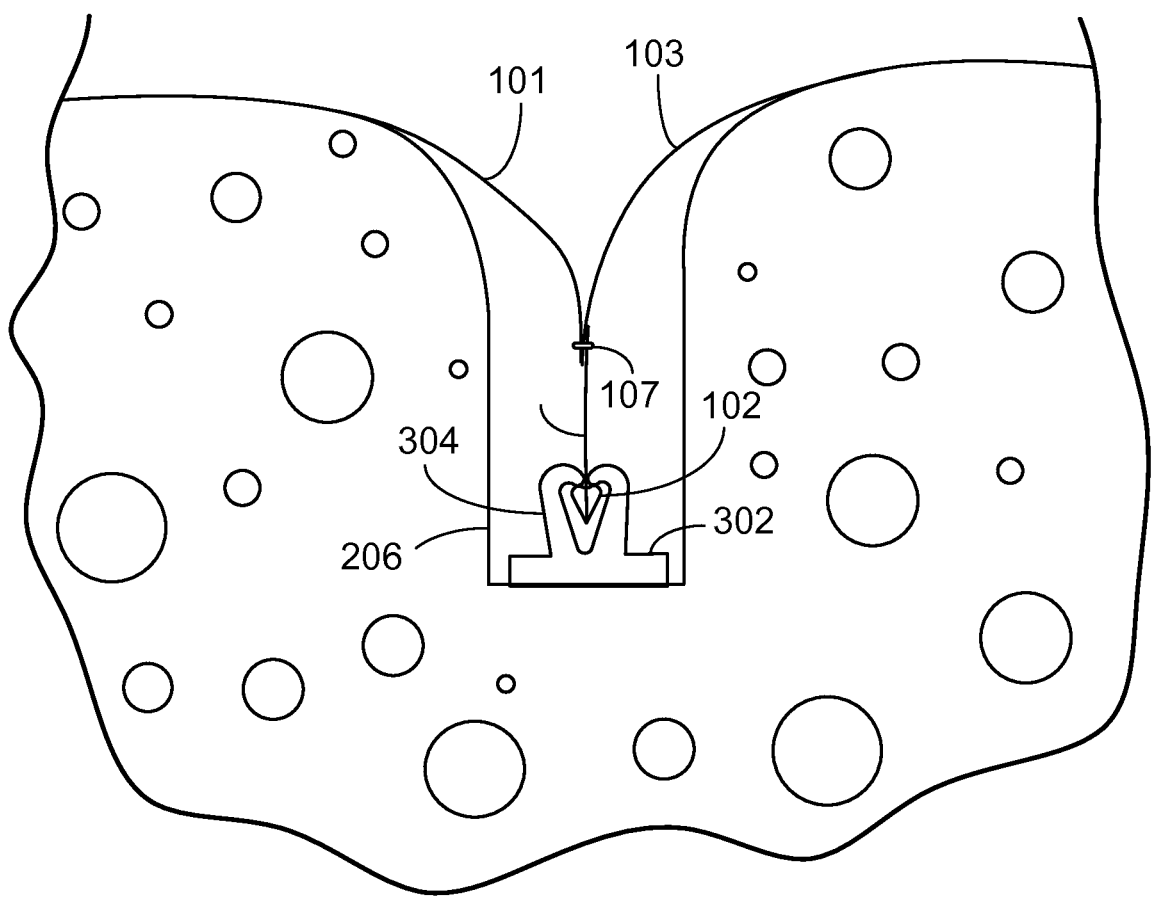
FIG. 3 is a partial cross-section view of a covered foam cushion, showing the seam of the cover secured at a foam trench by a plastic retainer clip.

Referring next to FIG. 3, strip 104 may alternatively be retained in trench 206 by a retainer 302 secured at the bottom of the trench. Retainer 302 may be, for example, in the form of the flexible fastener strip described in US 2012/0240364, the contents of which are incorporated herein by reference. Retainer 302 has pairs of opposing hooks 304 spaced along its length, defining therebetween a retention channel that is narrower than a thickness of the listing bead, which is shown in this example as protruding from both sides of the strip.

Retainer 302 can be formed as a continuous longitudinal extrusion of the profile shown in FIG. 3, and subsequently trimmed to separate the pairs of hooks if desired. The listing bead 102 is inserted into the channel and snapped into place under the opposing heads of the hooks. This insertion method is generally believed to require less manual manipulation than hog ring attachment, and the pairs of hooks may be closely spaced and the retainer flexed to follow a curved trench, such that the edge of strip 104 is secured along essentially its entire length, with less likelihood of puckering the outer cover surface. The magnitude of force required to insert and withdraw the bead can be controlled by modifying the geometry and dimensions of hooks 304. Preferably the required insertion force is significantly lower than the force required to pull the bead from the retainer once engaged. Retainer 302 can be secured at the bottom of the trench by any of several techniques known in the art, including by embedding the retainer in foam of the seat bun as the seat bun is formed.

Several different listing bead profiles are envisioned. For example, the listing bead 402 of FIG. 4 has a tapered lead-in portion 404 extending from the strip edge 406 to an intermediate shoulder 408 against which one of the hooks 304 of each of the pairs of hooks of the retainer bears to prevent the engaged listing bead from being pulled from the retainer. A stop portion 410 of the listing bead is spaced above shoulder 408 to define a hook head retention groove 412. Stop portion 410 may be of greater thickness than lead-in portion 404, to provide a positive and tactile stop as the bead is snapped into the retainer. In this example, the bead extends from only one side of the web 104, and the opposite hook head bears directly on the back side of the strip when snapped in place. Two-sided beads of such profile are also envisioned.

At the free edge 406 of the strip, the listing bead 402 has a severed edge coincident with a severed distal edge of the strip 104. Over the width of the listing bead, and throughout the width of reinforced region 108, resin contiguous with the bead encapsulates surface fibers of strip 104 to both permanently bond the bead to the strip and reinforce the strip against tearing and flexure. A degree of flexibility reduction may facilitate manipulation of the strip into engagement. The bead profile and resin can be selected to not over-stiffen the strip.

The listing beads of FIGS. 5A and 5B are tapered in thickness over a distance extending from the edge 406 of the strip, so as to have a thickness that gradually increases to a maximum adjacent shoulder 408. In the example of FIG. 5B, the listing bead extends from both sides of the web, and bead resin may connect the two bead portions through apertures in the web, as will be described more fully below. In each case, resin contiguous with resin of the bead extends above the shoulder, forming a layer across reinforced region 108 of the web. Where this layer joins with the bead at shoulder 408 the contiguous resin helps to stiffen the strip to prevent buckling just above the shoulder of the bead. Even a slight stiffening of the web just above the bead can facilitate manipulation of the strip during insertion of the bead into a retainer, or during hog ring installation.

The listing bead arrangement of FIG. 5C is similar in perimeter profile to the one of FIG. 5B, but is formed by folding a strip longitudinally between two half-beads, such that the distal edge of the final product is formed at a longitudinal fold 414, and the strip is of doubled thickness. The two sides of the strip can be welded or adhered together at the upper end (not shown), or sewn together such as during attachment to an upholstery seam. Fold 414 may be made at an exposed region of the fabric strip between the two molded bead halves, or along a relatively thin section of molded resin.

Figure 6:
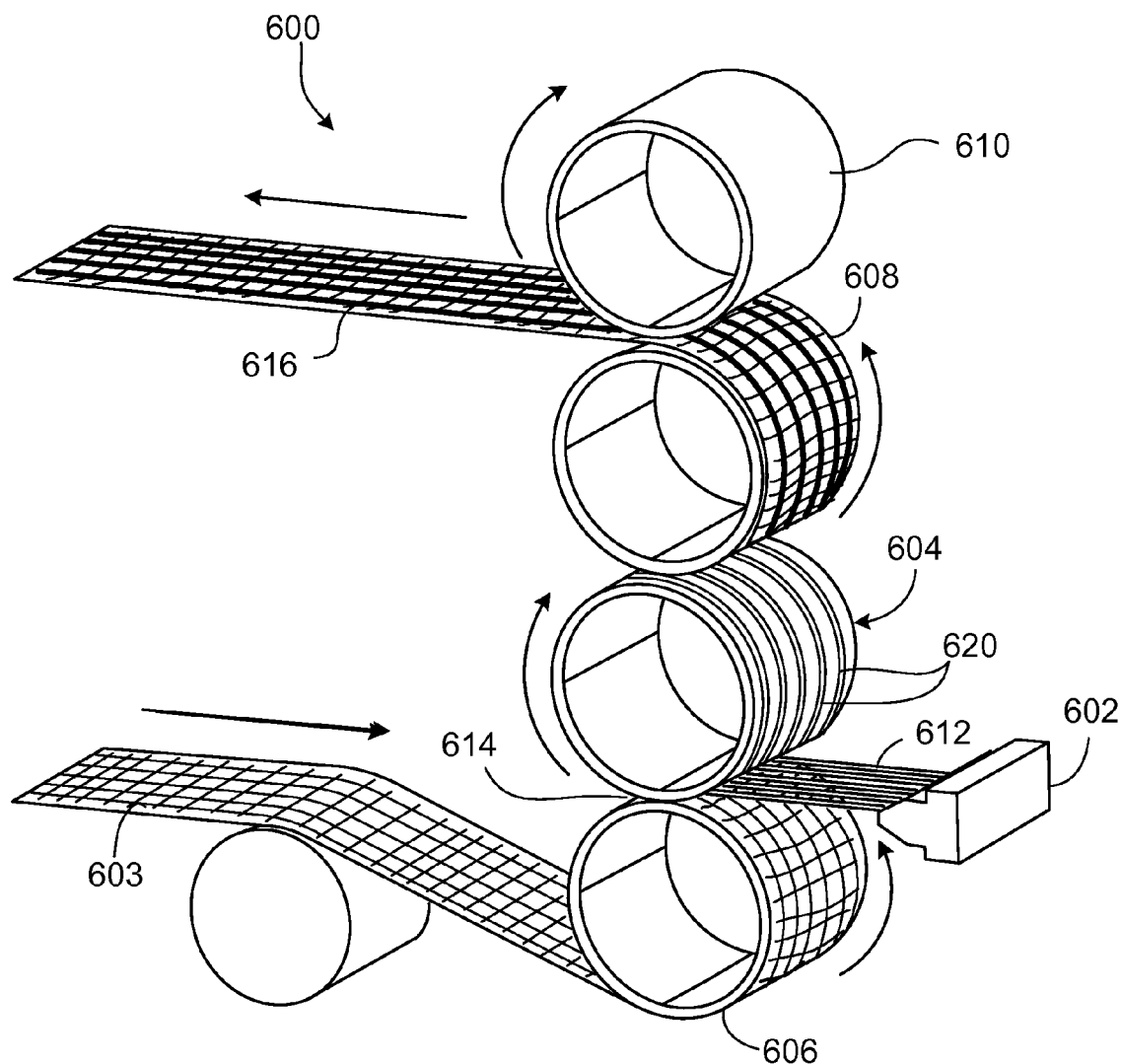
FIG. 6 schematically illustrates a method and apparatus for producing a continuous sheet of fabric with laminated longitudinal beads, such as for forming cushion cover tie-down strips.

Referring next to FIG. 6, apparatus 600 includes an extruder 602 with a segmented die producing separate flows, a forming roll 604, a pressure roll 606, a transfer roll 608, and a fourth roll 610. Fabric 603 is a flexible substrate that is fed into the apparatus from a supply spool (not shown) and threaded through the nips between rolls, as shown. For ease of view, only the outer portions of each roll are shown. At least rolls 604, 606 and 608 are normally driven in counter-rotating fashion.

The outer surface of the forming roll 604 defines multiple bead molding channels 620, each extending circumferentially about the forming roll and shaped to form a pair of adjacent listing beads of desired profile. The molding channels 620 are spaced apart from one another along the axis of rotation of forming roll 604. Other than for the molding channels 620, the outer surface of forming roll 604 may be smooth and cylindrical, as are the outer surfaces of the other rolls. Some roll surfaces, such as the surface of roll 606, may be textured or knurled for grip, or made of a compliant material such as a hard rubber. To keep the substrate spread out laterally as it enters the process, the substrate may be trained about a spreader roll 611. Molten resin 612 is introduced from extruder 602 in separate flows into the nip 614 between rolls 604 and 606, the flows each aligned with a corresponding channel 620 of the forming roll. In nip 614, the resin is laminated to the surface of fabric 603 and shaped to form listing bead pairs. The formed resin is cooled while on forming roll 604, and then stripped from roll 604 with fabric 603 at the nip between rolls 604 and 608. The laminated product 616 is passed through another nip between rolls 608 and 610, where the formed resin beads can be adjusted as needed, and then either slit and cut into separate strip lengths, or spooled for transport.

The molten resin 612 can be one of various suitable materials capable of bonding to the web surface, either chemically or mechanically upon solidification, and retaining the formed bead shape. Suitable materials include, for example, thermoplastic materials, such as polypropylene, polyethylene, and polyamides. In some cases, the resin is chosen to promote bonding to a particular substrate material. Furthermore, different materials can be introduced to different molding channels 620 depending on the desired fastener product characteristics (e.g., rigidity, hardness, etc.). Other details of controlling lamination of resin to fabric under pressure in nips can be found in U.S. Pat. Nos. 5,518,795, 6,202,260 and 7,048,818, the entire contents of which are incorporated by reference herein.

Figure 6A:
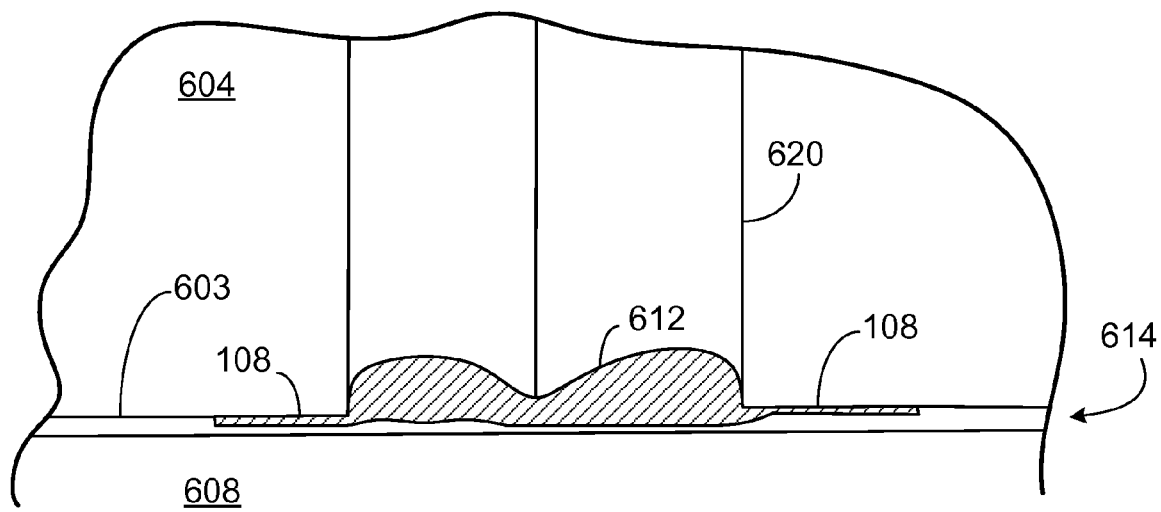
FIG. 6A is an enlarged view into a portion of the forming nip of the apparatus of FIG. 6, looking in the direction of resin flow, showing resin being molded in a molding channel.
Figure 7:
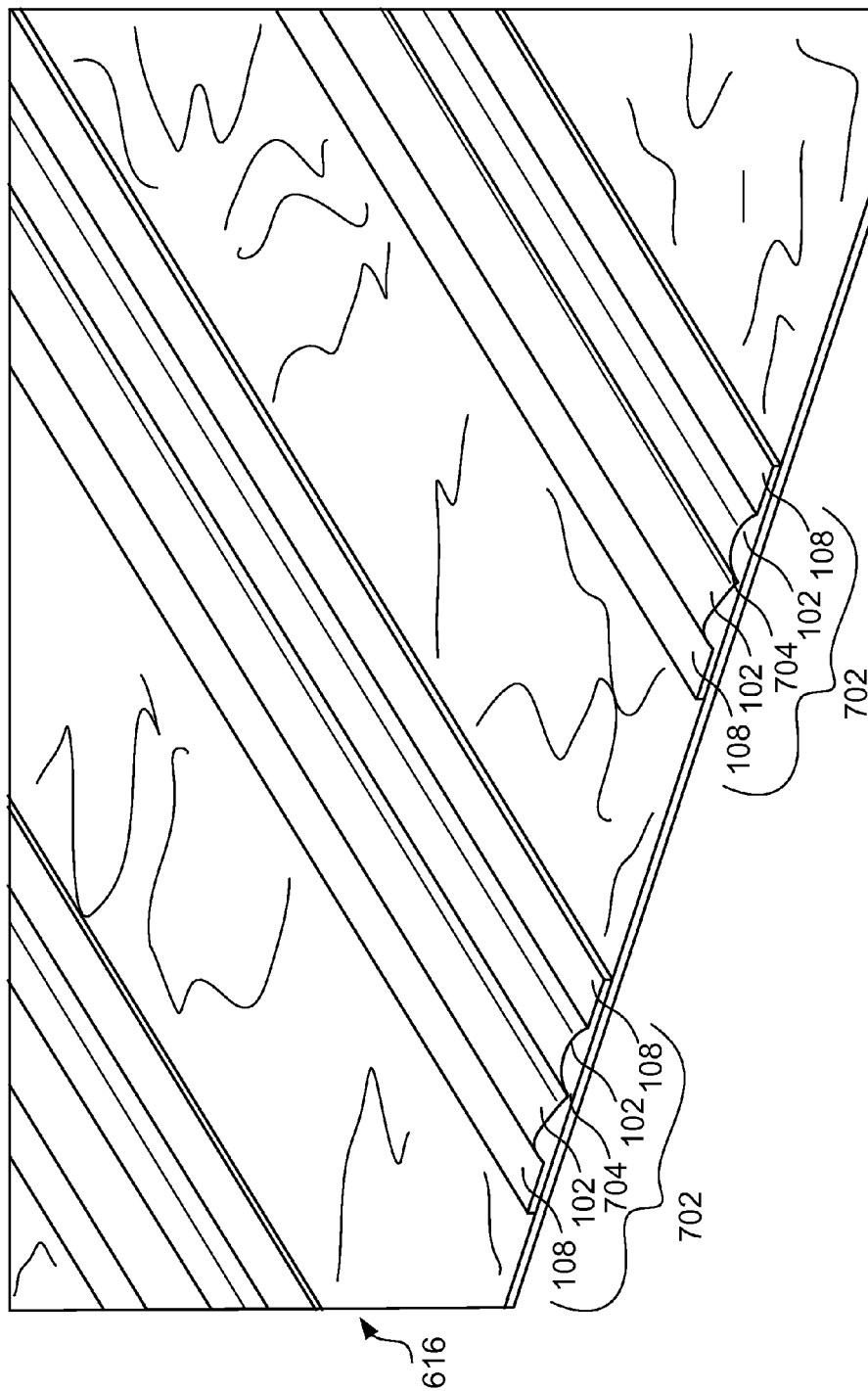
FIG. 7 illustrates a perspective view of a sheet of flexible material formed on the apparatus of FIG. 6.

Referring also to FIG. 6A, sufficient resin 612 is introduced to each channel 620 in nip 614 to fill the channel and extend a distance beyond each edge of the channel along the fabric 603 to form the reinforced regions 108. Across the channel and within the reinforced regions on either side of the channel, the resin impregnates the fabric such that when it solidifies it becomes permanently and mechanically secured to the fabric surface. Because there is no feature of the mold roll surface constraining the edges of the resin in the reinforced regions, the reinforced regions will typically exhibit some width variation along the resulting strips. Such width variation, within reason, does not impede product utility or performance. Referring next to FIG. 7, the laminated continuous sheet 616 includes multiple molded and longitudinally continuous resin lanes 702, each lane 702 including a pair of adjacent listing beads 102 joined along a slitting channel 704. The sheet 616 can be severed along the slitting channels 704 and midway between the resin lanes 704 to produce several separate strips each carrying a molded listing bead 102 extending along a severed longitudinal edge thereof. Each resulting strip may be employed as the fabric strip 104 sewn into the cover of FIGS. 1-3. Such a process can provide particularly low production costs.

Figure 8:
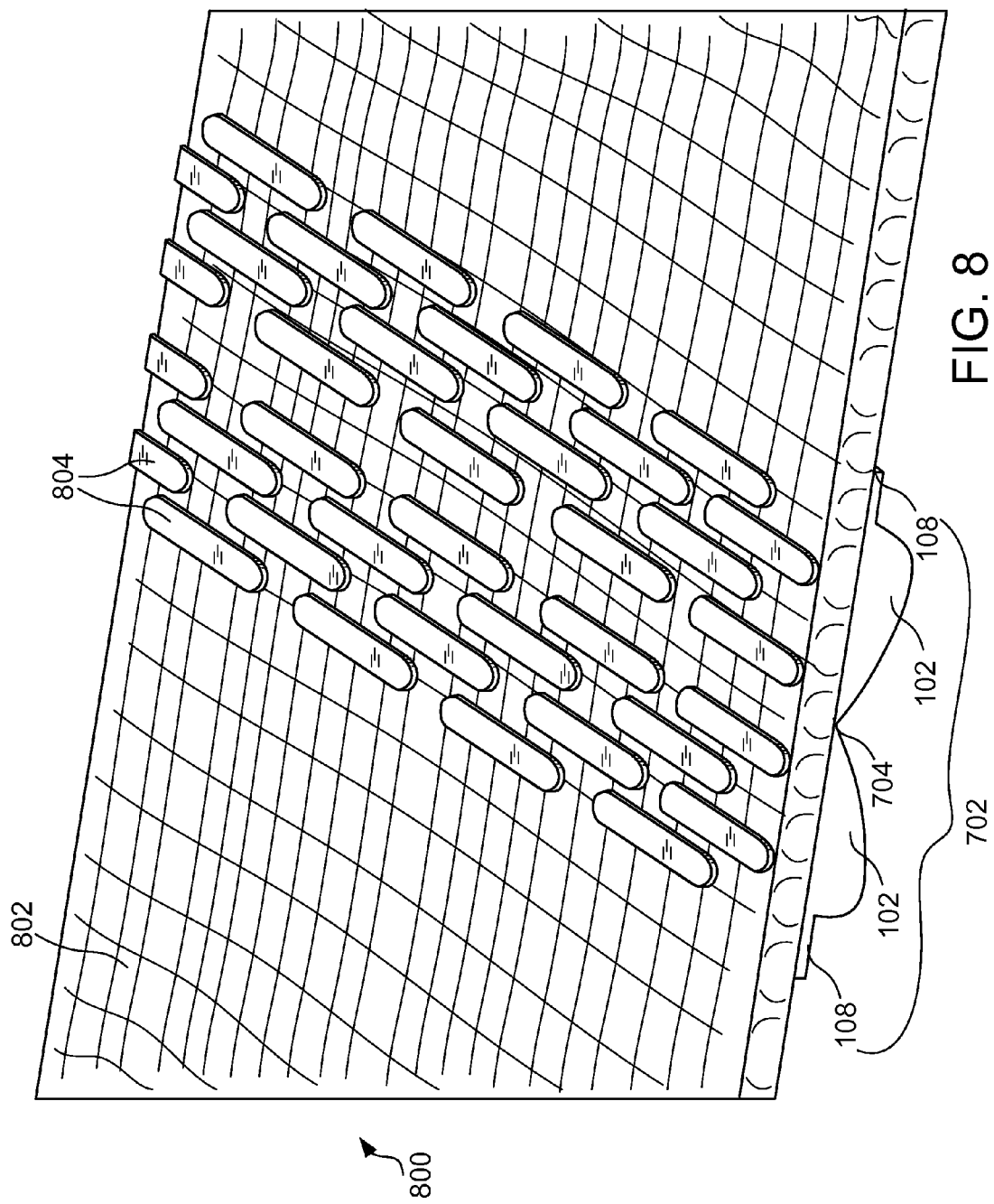
FIG. 8 shows resin contiguous with a profiled lane on one side of the sheet extending through holes to the opposite side of the sheet.

Penetration of the moldable resin into the fabric can be varied for different effects and purposes. For example, in the continuous sheet product 800 shown in FIG. 8, the molded resin fills apertures 804 in the fabric and forms exposed resin areas on the back side of the fabric. In this case the flexible fabric or substrate 802 is introduced into the nip with apertures 804 aligned with the molten resin and molding grooves. The pressure in the nip forces the resin into the apertures 804 and into contact with the surface of the pressure roll. The listing beads 102 are strongly attached to the flexible substrate 802, due in part to the resin in the apertures 804.

Some profile beads are not formed with slitting channels. For example, the product of FIG. 9 is formed by a method similar to that described above, but in which each molding groove forms a single profile bead with a tapered section 810 ramping from a narrow edge 812 to a shoulder 814. By cutting this product along parallel lines 816, separate tiedowns like the one shown in FIG. 1 can be formed. Cutting through the substrate 603 at lines 816 creates severed substrate edges aligned with the narrow edges 812 of the profile beads.

Extrusion fluctuations and variations in the density or structure of the substrate can cause the width of the reinforced region of resin to fluctuate. This can be particularly true when molding onto fabric substrates. Such width variation can be reduced by incorporating a small circumferential groove about the mold roll (e.g., roll 604 in FIG. 6), spaced from the profile bead molding groove and positioned to correspond with the inboard edge of the reinforced region. Fluctuations in nip pressure cause the edge groove to be filled to varying degrees while the visible edge of the formed reinforcing region remains relatively linear. On the product the result will be a longitudinal rib spaced from the molded profile bead, such as rib 818 in FIG. 10. The size of the rib shown in this figure is exaggerated for illustration. It is believed that the groove forming this rib acts as an accumulator for resin laterally displaced in the molding nip. More details on the use of such edge ribs in forming laminated fastener products can be found in U.S. patent application Ser. No. 13/804,082, filed Mar. 14, 2013 and entitled Forming Laminated Touch Fasteners, the entire contents of which are hereby incorporated by reference.

The example of FIG. 10 also contains other features that may be combined in suitable applications. For example, a reinforcing rim 820 is provided about aperture 110, providing a thicker section for receiving and holding a hog ring. The resin forming a series of rims 820 is molded in appropriately shaped recesses on the surface of the molding roll as the profile bead is formed, and the apertures 110 are punched through the resulting molded plateaus to create rimmed apertures. The rim may extend about the entire circumference of the aperture and be spaced from shoulder 814 of the profile bead, as in FIGS. 10 and 10A, or the aperture can be formed immediately adjacent the shoulder as in FIG. 10B, creating a wide shoulder for a hog ring or other mating clip to bear directly against. Also, profile bead 822 is reinforced with a continuous fiber or wire 824 completely encapsulated within the resin. Wire 824 strengthens the bead against loads applied by hog rings or other mating clips, helping to distribute clip loads along the length of the bead. Wire 824 may be of metal or a particularly strong fiber.

It is desirable, such as to maintain consistent nip pressure and visibly straight edges of the resin on the substrate, to maintain a relatively constant effective cross-sectional area of the molding grooves and other recesses at all circumferential locations about the molding roll. Thus, at discrete locations where additional resin is to be formed into an aperture rim or other projecting structure, it may be desirable to reduce the cross-sectional area of other portions of the forming recesses. In the example of FIG. 10, the cross-sectional area of rib 818 is reduced (or eliminated) where rim 820 is formed, to keep the overall molding cross-sectional area relatively constant.

Figure 11:
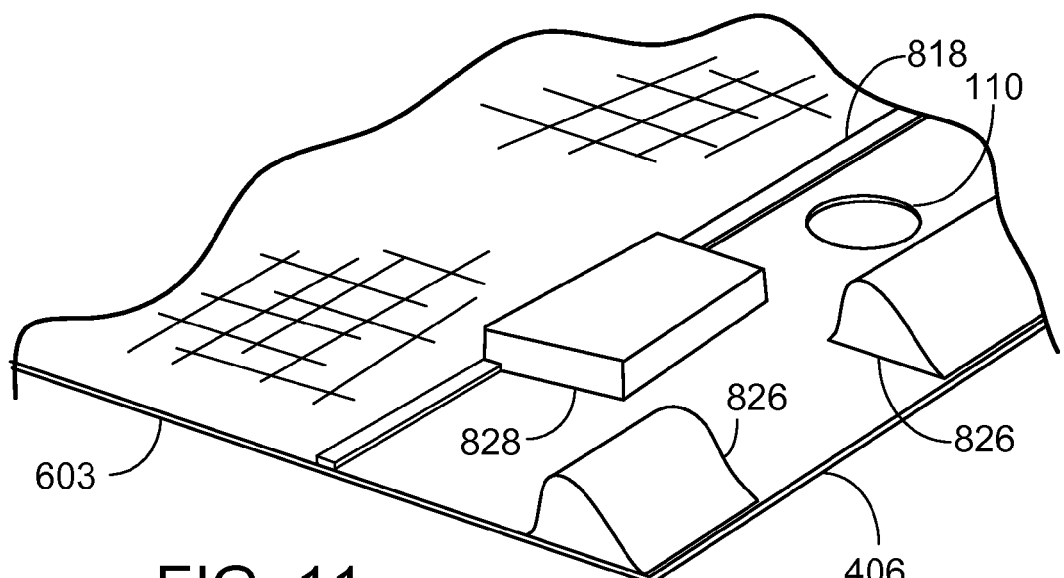
FIG. 11 illustrates a sectioned profile bead, alternating with molded inboard resin pads.

In the example of FIG. 11, the entire profile bead is segmented, with longitudinally discrete profile bead segments 826 spaced apart along the edge 406 of the substrate. To keep the molding flow area relatively constant, a raised resin pad 828 is molded in alignment with the space between adjacent profile bead segments 826 and spaced from edge 406. Pad 428 is of essentially the same transverse cross-sectional area as the profile bead. Segmenting the profile bead helps to maintain flexibility of the substrate edge, and can be particularly useful in applications in which a tie-down is to be bent to follow a trench with a relatively sharp bend. If apertures 110 are to be provided for hog rings, they should be positioned in alignment with profile bead segments.

Figure 12:
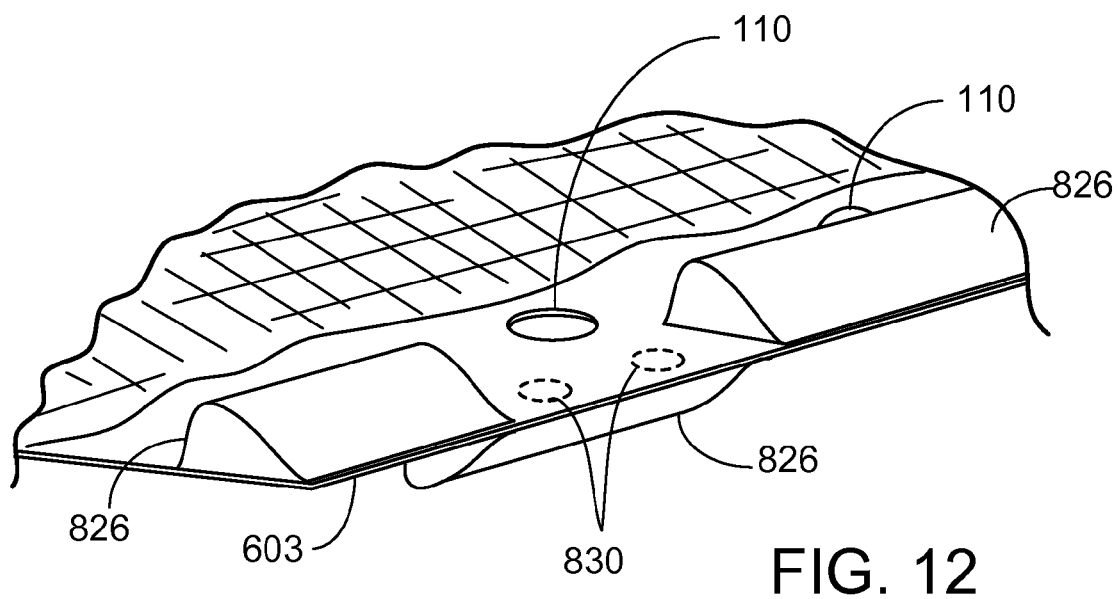
FIG. 12 shows a segmented profile bead, with alternating segments on either side of a substrate edge.

In the example of FIG. 12, the profile bead is in the form of profile bead segments 826 that alternate between the two sides of the substrate 603 along the substrate edge, with the spaces between adjacent segments 826 on one side aligned with the segments 826 on the other side. In this manner, the molding flow area remains relatively constant and the product maintains enhanced flexibility. Furthermore, apertures 110 can be placed in alignment with segments on either side of the substrate. The segments formed on the side of the substrate facing away from the molding roll in the nip can be formed in recesses provided in the opposing roll, and from resin pressed through apertures 830 in the substrate.

Profile beads can be formed on both sides of fabric strips in various ways. Referring back to FIGS. 6 and 8, in one example the outer surface of pressure roll 606 is provided with molding grooves similar to those of mold roll 608, and the resin and apertures 804 are such that pressure in the molding nip forces sufficient resin through apertures 804 to form a similarly profiled lane of resin on the back side of the fabric, such that continuous listing beads on both sides of the resulting strips are formed of the same flow of resin and are connected by contiguous resin extending through apertures 804. Depending on the molding conditions, it may be necessary to hold the fabric taut widthwise as it passes through the nip.

Figure 13:
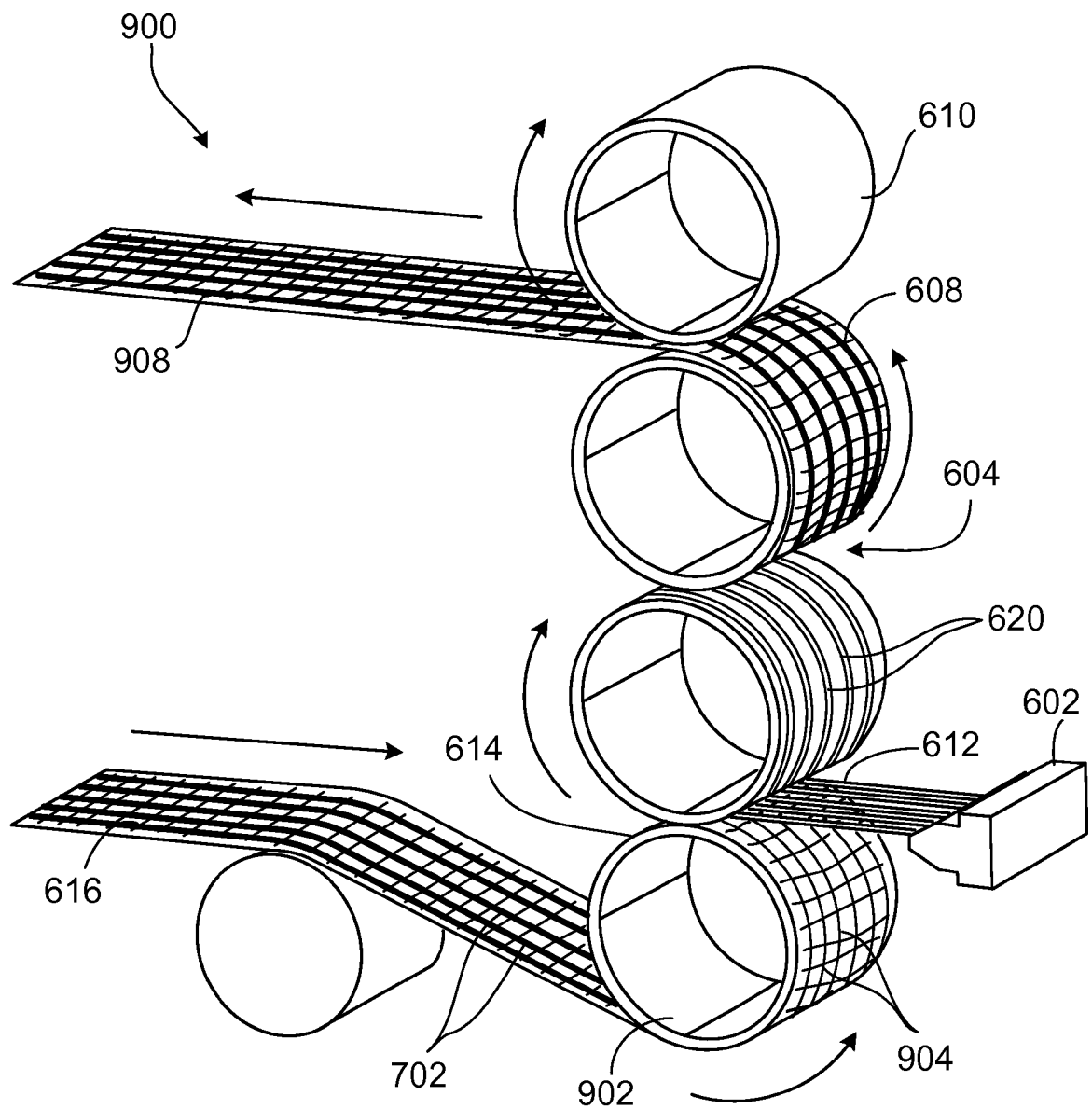
FIG. 13 schematically illustrates a first method and apparatus for producing a continuous sheet of fabric with longitudinal beads of resin laminated on both sides.

FIG. 13 illustrates an alternate method of forming strips with listing beads on both sides of the strips. In apparatus 900 the outer surface of pressure roll 902 defines retention channels that receive profiled resin lanes of a previously laminated sheet 616 as roll 902 carries the sheet into the pressure nip 614. Additional resin 612 is introduced to nip 614, to a side of the sheet opposite the already formed resin lanes 702, thus forming identical resin lanes on the opposite side.

Figure 14:
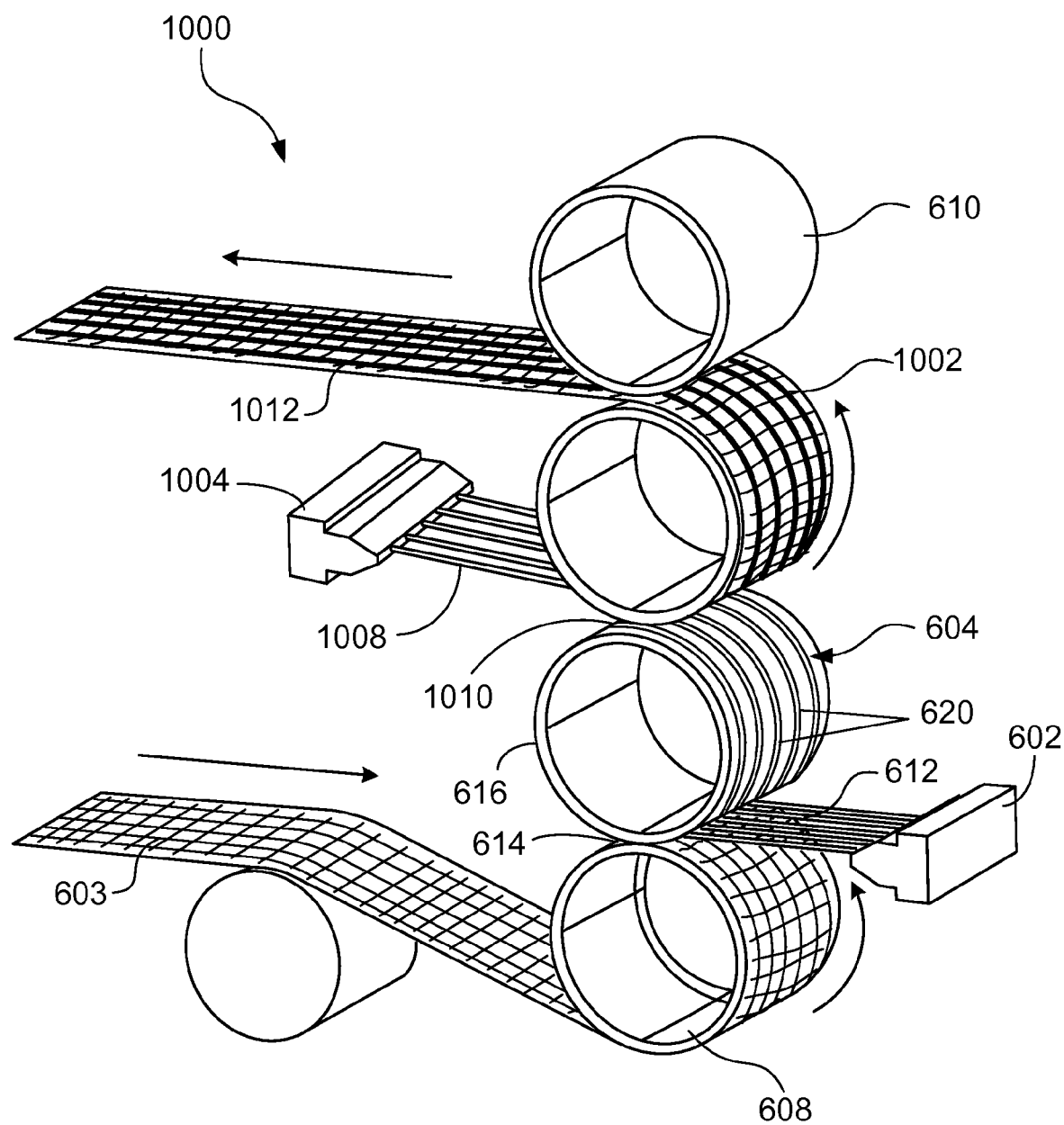
FIG. 14 schematically illustrates a second method and apparatus for producing a continuous sheet of fabric with longitudinal beads of resin laminated on both sides.

FIG. 14 illustrates yet another method of forming two-sided listing beads. Apparatus 1000 includes a first mold roll 604 as described above, and a second mold roll 1002 defining a second pressure nip 1010 in cooperation with the first mold roll 604. Second mold roll 1002 similarly features molding channels. A second extruder 1004 extrudes resin 1008 in multiple, spaced apart flows into pressure nip 1010, forcing resin into the molding recesses of roll 1002 to form profiled lanes of resin on a face of sheet 616 opposite lanes formed in nip 614.

Figure 15:
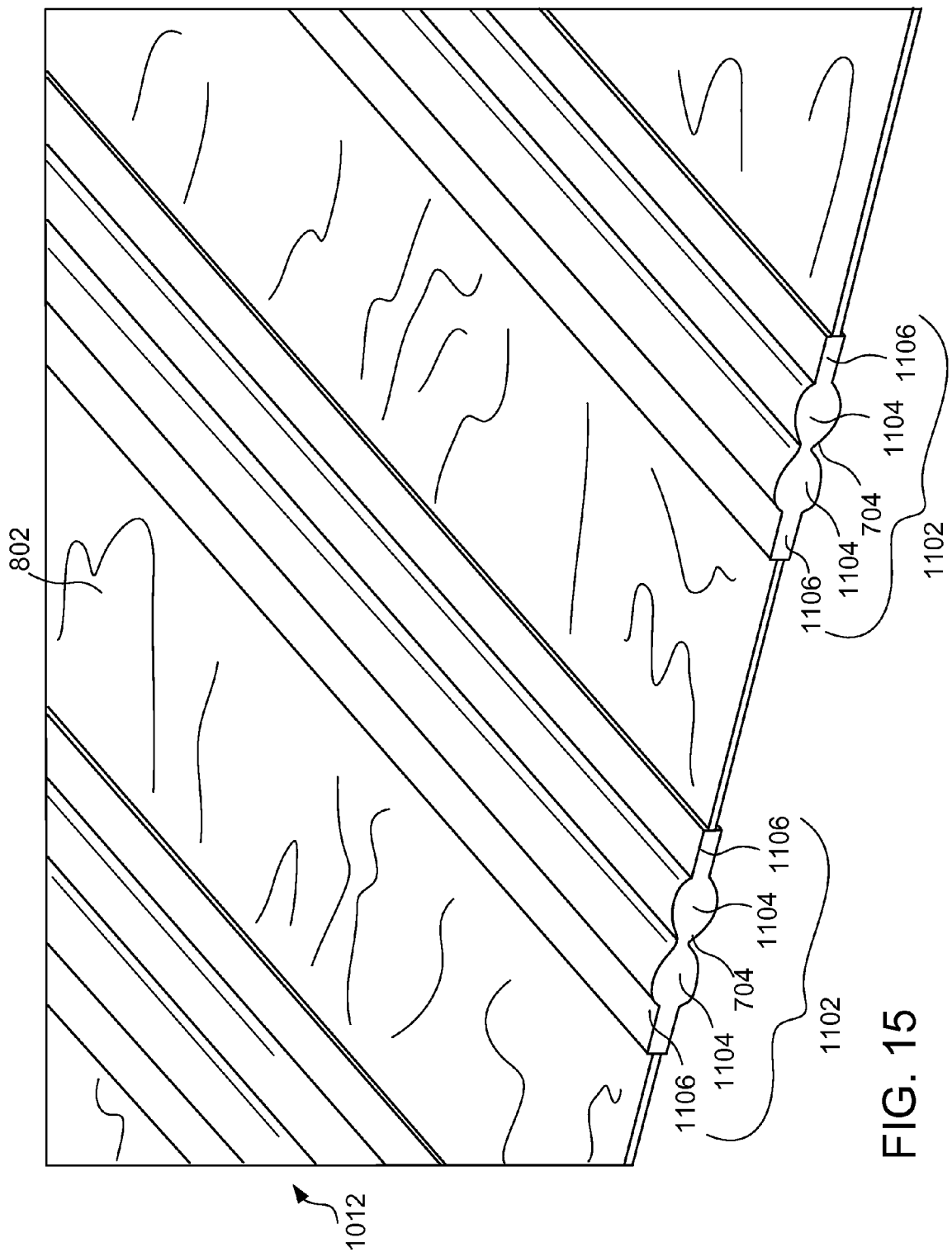
FIG. 15 illustrates a perspective view of a sheet of flexible material produced with the method of either FIG. 13 or FIG. 14.

Produced by any of the above methods, the two-sided sheet 1012 of FIG. 15 features a plurality of double-sided resin lanes 1102, each forming a pair of double-sided listing beads 1104 and double-sided reinforced regions 1106. Such a sheet can be split along slitting channels 704 and midway between adjacent lanes 1102 to form separate strips, each having a double-sided listing bead along an edge as shown in FIG. 5B, for example.

Figure 16:
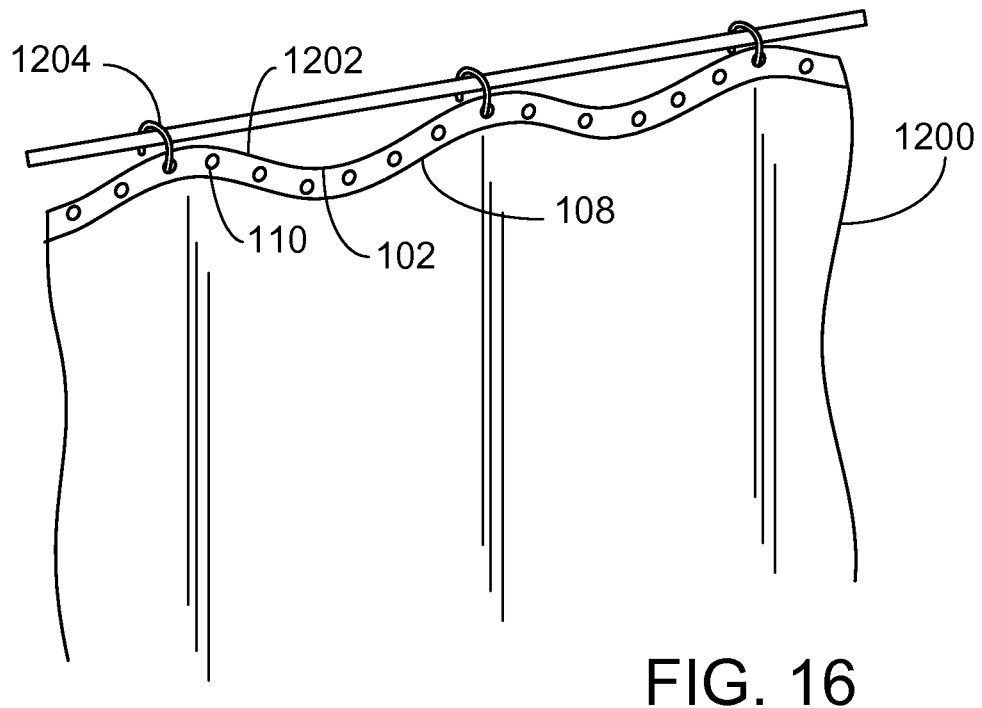
FIG. 16 shows a lightweight curtain, such as for separating hospital room patient areas.
Figure 17:
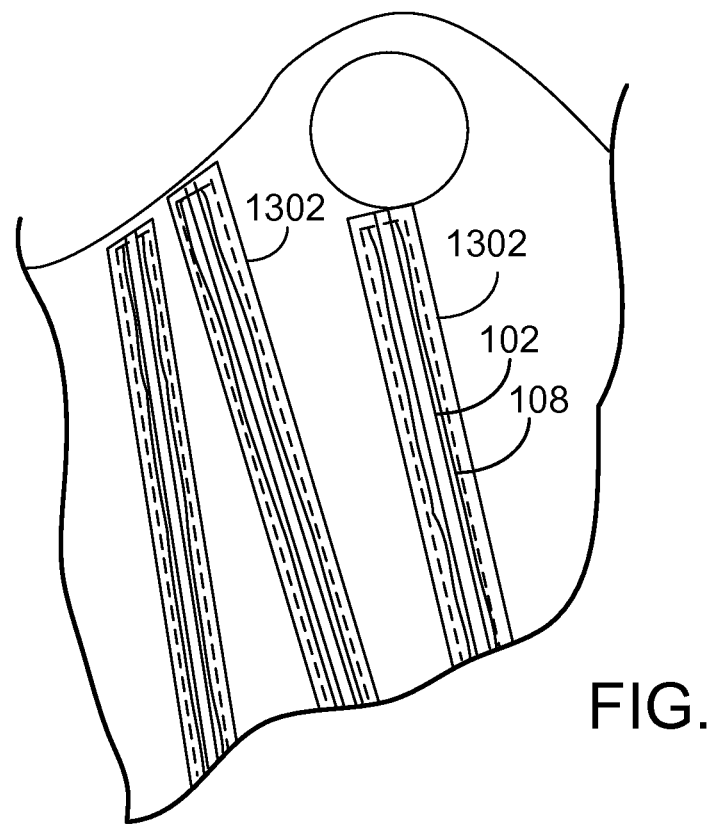
FIG. 17 shows three fabric strips sewn into a fabric as stays.

Materials formed by the above processes can have uses beyond securing covers over cushions. For example, the top edge 1202 of the lightweight curtain 1200 of FIG. 16 carries a listing bead 102 and has a reinforced region 108 with resin contiguous with the bead. Apertures 110 receive hooks 1204 to hang the curtain from a rod. The curtain may be formed entirely out of a continuous length of product formed on the apparatus of FIG. 6, using a lightweight non-woven material for the substrate and laminating the bead and reinforcing resin directly onto the substrate. Alternatively, narrow strips of product 104 (FIG. 1) can be slit from a wide sheet and then sewn along an edge of a non-woven or other curtain material. In either arrangement, the bead and the resin in the reinforced region help to strengthen, and slightly stiffen, the upper edge of the curtain. Strips of fabric carrying listing beads and reinforcing resin can also be employed for other uses. For example, strips of the fabric cut so as to have centrally located listing beads can be used as stays within apparel. In the garment of FIG. 17, stays 1302 carry beads 102 that act as stiffening ribs, and are sewn directly into the garment to provide a desired shape and/or stiffness.

The above processes can also be employed to form a resin bead along the edge of a flexible fabric panel cover. Referring to FIG. 18, fabric cover 1402 has an edge bead 1404 secured to an edge of the cover and forming a hook that retains the cover to an edge of a rigid panel 1406, such as a sheet metal panel. Bead 1404 defines a crook that receives the edge of the panel, such as when the cover is resiliently stretched. Bead 1404 may be segmented, as discussed above, but for many flexible covers a continuous bead may produce a neater edge appearance and hold the cover against wrinkling. Two such cover beads may be produced by first molding a preform strip having a straight or canted flange, and then deforming the molded flange to form a crook. As shown in FIG. 19, a double-bead preform strip can be molded with canted flanges 1408 extending from a common base 1410 by providing the mold roll with an appropriately shaped set of nesting molding rings, including two inner rings 1412 with circumferential surfaces shaped to form the upper side of flanges 1408, sandwiched between two outer rings 1414 with axial protrusions 1416 that extend about the inner rings to form the undersides of the flanges. Referring to FIG. 20, the resulting laminate can be slit between flanges 1408 along line 1418 to form two separate edge beads on separate fabric covers. Alternatively, prior to slitting the flanges can be plastically deformed toward the base to deepen their crooks, as shown in FIG. 21, such as by a force applied in the direction of arrow F. Referring also to FIG. 6, such deformation can be performed immediately following formation of the preform strip, by appropriately configuring the nip between rolls 608 and 610. For example, roll 610 may be configured with shaped grooves that receive the flanges and bend the flanges toward the base under pressure, preferably while the molded flanges retain some heat from molding.

Figure 22:
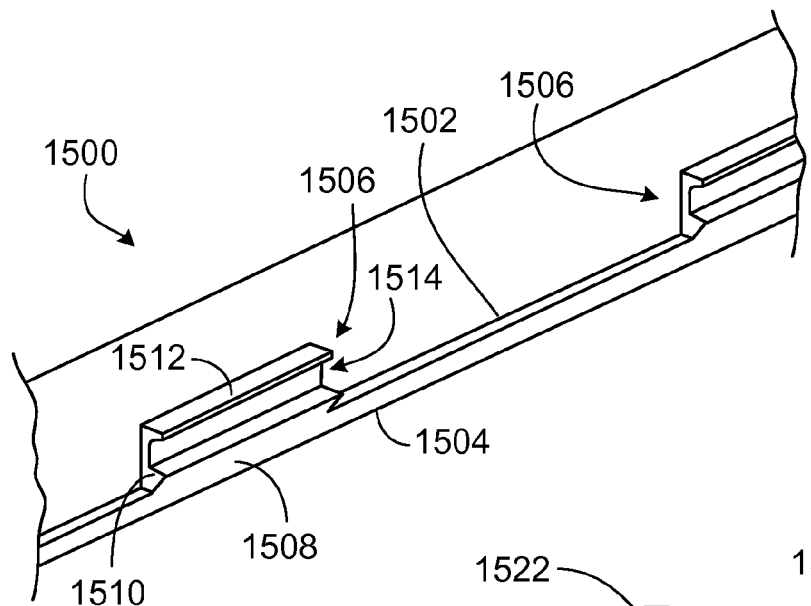
FIG. 22 shows a tie-down having a listing bead configuration with spaced-apart clip receivers.

The listing bead profile may assume various shapes, and the profile shape need not be continuous along the edge of the strip for some applications. Referring next to FIG. 22, tie-down 1500 has an overmolded listing bead 1502 of which the edge portion forms a continuous rail 1504 along and encapsulating the fabric edge, and which includes discrete clip receivers 1506 at spaced intervals and extending inboard from rail 1504. Each clip receiver 1506 has a leading face 1508 coplanar with the tapered side of the rail but that extends farther away from the edge and terminates at a shoulder 1510. An upper flange 1512 is spaced from the shoulder so as to define a longitudinal recess 1514 into which the mating clip cam surfaces snap during installation.

Figure 23:
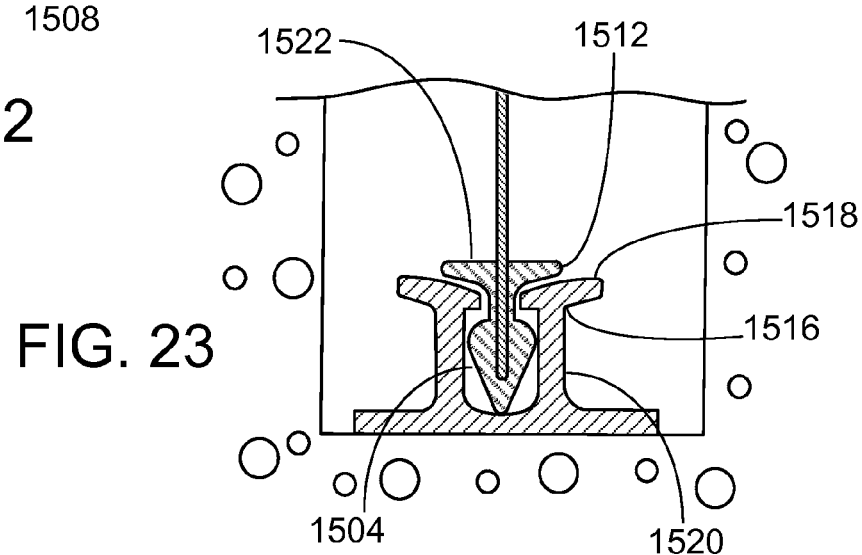
FIG. 23 is a cross-sectional view, showing the tie-down of FIG. 22 secured in a clip in a cushion trench.

Referring also to FIG. 23, the underside surface 1516 of flange 1512 functions as a stop surface against which the upper surface 1518 of resilient clip fingers 1520 bear as the listing bead is pressed into the clip beyond the point at which full engagement has been realized. The upper surface 1522 of the flange is significantly wider than the listing bead rail and is readily engaged with an operator's fingers to press the clip receiver into full engagement with the clip. That flanges 1512 are present only at locations along the tie-down where clips are located can help the operator quickly locate the clip receivers for rapid and blind engagement. During engagement, the leading faces on either side of the lower portion of the clip retainer, in cooperation with the canted upper faces 1518 of the clip fingers, help to guide the clip retainer into centered alignment with the clip. Further pressure at the upper flange surface 1522 spreads the clip fingers apart until their cam surfaces snap over the shoulders on either side of the clip retainer. If necessary for repositioning, the clip fingers can be manually pried apart or otherwise separated, to allow the clip retainer to be released.

Figure 25:
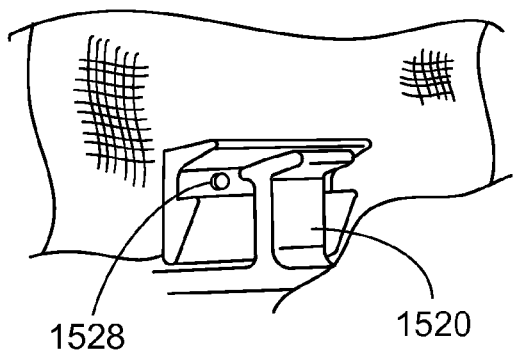
FIG. 25 shows the secured clip receiver of FIG. 24 engaged by a clip.
Figure 24:
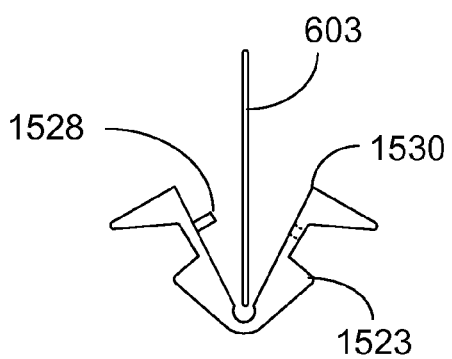
FIG. 24 shows permanently securing a clip receiver to the edge of a substrate.

As shown in FIG. 23, the listing bead rail 1504 in this example completely envelops the lower edge of the fabric substrate of the tie-down. Such a rail can be overmolded in an extrusion process, for example. Discrete clip receivers can be individually injection molded along the substrate, such as by methods and with machines known from the manufacture of zippers and the like. Alternatively, the profile of the clip receiver can be formed as a continuous extrusion, with material later removed from between the locations where the clip receivers are to remain. Or the clip receivers can be formed as discrete resin components and permanently fastened over the edge of the substrate, as illustrated in FIG. 24. In that example, an injection-molded clip receiver 1524 is molded with a notch 1526 at which the receiver can be plastically flexed to clip over the edge of substrate 603, with molded resin protrusions 1528 of one side of the receiver passing through apertures in the substrate and into holes 1530 of the other side of the receiver, where the pins are sonically welded to form a clip retainer permanently fastened to the substrate, as shown in FIG. 25. In this example, the listing bead does not include a continuous rail, and the distal edge of the substrate is free of listing bead resin in the spaces between clip retainers. Other means of securing retainer clips to the substrate are also envisioned, including adhesives.

A number of embodiments of the invention have been described. Nevertheless, it will be understood that various modifications may be made without departing from the spirit and scope of the invention. Accordingly, other embodiments are within the scope of the following claims.

What is claimed is:

1. A method of making a continuous sheet-form product carrying a profiled bead of resin along a length thereof, the method comprising:
    continuously passing a flexible substrate through a nip defined between two counter-rotating rolls;
    introducing a flow of moldable resin into the nip between the flexible substrate and a first of the two rolls, in an area in which an outer surface of the first of the two rolls defines a peripheral molding recess; and
    molding the resin in the peripheral molding recess to form a profiled bead bonded to a side of the flexible substrate and extending along the substrate between exposed regions of substrate surface,
    wherein the recess is shaped such that the profiled bead defines a longitudinal slitting channel extending along the flexible substrate, along which channel the profile bead has a lesser tear resistance than on either side of the channel.

2. The method of claim 1, further comprising slitting the profiled bead and substrate longitudinally along the slitting channel, thereby forming two separate substrate strips each having a corresponding portion of the bead extending along an exposed, severed edge of the substrate.

3. The method of claim 1, wherein the resin is introduced in separate flows to two spaced apart regions of the flexible substrate and molded in two corresponding molding recesses of the first of the two rolls, thereby forming two spaced-apart profiled beads each defining a slitting channel and each extending along the flexible substrate between longitudinal exposed regions of substrate surface.

4. The method of claim 3, wherein a portion of the flowable resin engages the outer surface of the first of the two rolls adjacent the molding recess, and impregnates the substrate in a region immediately adjacent the profiled bead as the resin is molded, thereby forming a reinforced region of the substrate adjacent the profiled bead.

5. The method of claim 4, wherein the outer surface of the first of the two rolls further defines a circumferential groove extending about the first of the two rolls and spaced from the peripheral recess, and wherein molding the resin forms a rib of resin in the groove, the rib forming a lateral edge of the reinforced region.

6. The method of claim 1, wherein the substrate, as introduced to the nip, defines holes therethrough, and wherein the substrate is introduced to the nip with the holes aligned with the moldable resin, such that pressure in the nip forces some of the resin into the holes.

7. The method of claim 6, wherein a second of the two rolls has a surface that defines a recess positioned to receive resin pressed through the holes of the substrate in the nip, thereby forming a molded protrusion of the resin on a side of the substrate opposite the profiled bead.

8. The method of claim 1, further comprising passing the substrate and profiled bead through a second nip in which the formed bead is plastically deformed to alter a shape of the profiled bead.

9. The method of claim 1, further comprising introducing a pre-formed, longitudinally continuous wire to the nip with the moldable resin, such that the wire becomes embedded in the profiled bead as the resin is molded.

10. A method of making a continuous flexible strip of substrate carrying a bead of resin along an edge thereof, the method comprising:
continuously passing a flexible substrate sheet through a nip defined between two counter-rotating rolls;
introducing a flow of moldable resin into the nip between the flexible substrate and a first of the two rolls, in an area in which an outer surface of the first of the two rolls defines a peripheral molding recess; and
molding the resin in the peripheral molding recess to form a profiled bead bonded to a side of the flexible substrate and extending along the substrate between exposed regions of substrate surface, the formed profiled bead having a cross-section that increases in thickness across a tapered region of the profiled bead to a longitudinal shoulder defining an abrupt transition in bead thickness; and then
longitudinally severing the substrate adjacent the tapered region of the profiled bead along a line spaced from the shoulder, thereby forming a strip of the substrate carrying a bead of molded resin adjacent a severed longitudinal edge of the strip.

11. The method of claim 10, wherein the resin is introduced in separate flows to two spaced apart regions of the flexible substrate and molded in two corresponding molding recesses of the first of the two rolls, thereby forming two spaced-apart profiled beads each extending along the flexible substrate between longitudinal exposed regions of substrate surface.

12. The method of claim 11, wherein a portion of the flowable resin engages the outer surface of the first of the two rolls adjacent the molding recess, and impregnates the substrate in a region immediately adjacent the profiled bead as the resin is molded, thereby forming a reinforced region of the substrate adjacent the profiled bead.

13. The method of claim 10, wherein the substrate, as introduced to the nip, defines holes therethrough, and wherein the substrate is introduced to the nip with the holes aligned with the moldable resin, such that pressure in the nip forces some of the resin into the holes.

14. The method of claim 13, wherein a second of the two rolls has a surface that defines a recess positioned to receive resin pressed through the holes of the substrate in the nip, thereby forming a molded protrusion of the resin on a side of the substrate opposite the profiled bead.

15. The method of claim 10, wherein the substrate has a fabric surface on which the profiled bead is molded.

16. The method of claim 10, wherein the bead is segmented, segments of the bead being longitudinally spaced and each defining a shoulder segment; wherein the peripheral recess is circumferentially discontinuous and includes separate recess cavities; and wherein molding the resin comprises filling the separate cavities from a continuous flow of the moldable resin.

17. The method of claim 16, wherein molding the resin further comprises molding a series of resin protrusions extending from the substrate and spaced laterally from, and longitudinally between, adjacent segments of the bead.

18. The method of claim 16, wherein molding the resin further comprises pressing resin through the substrate in spaces between the recess cavities, thereby forming a longitudinally spaced series of protrusions on a side of the substrate opposite the bead segments.

* * * * *